US012776023B2

(12) United States Patent
Krishnamoorthi et al.

(10) Patent No.: US 12,776,023 B2
(45) Date of Patent: Oct. 27, 2026

(54) MICROSTRUCTURAL LAYERING OF THERMAL SPRAY COATING

(71) Applicants: Rolls-Royce Corporation, Indianapolis, IN (US); Rolls-Royce North American Technologies, Inc., Indianapolis, IN (US)

(72) Inventors: Sidharth Krishnamoorthi, Indianapolis, IN (US); Matthew R. Gold, Indianapolis, IN (US); Robert Golden, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 145 days.

(21) Appl. No.: 18/661,124

(22) Filed: May 10, 2024

(65) Prior Publication Data

US 2025/0348994 A1 Nov. 13, 2025

(51) Int. Cl.
*G06T 7/00* (2017.01)
*G06T 5/92* (2024.01)
(Continued)

(52) U.S. Cl.
CPC .............. *G06T 7/0006* (2013.01); *G06T 5/92* (2024.01); *G06T 7/60* (2013.01); *G06V 10/24* (2022.01); *G06V 10/7715* (2022.01); *G06T 2207/20056* (2013.01); *G06T 2207/30136* (2013.01); *G06V 2201/06* (2022.01)

(58) Field of Classification Search
CPC ........... G06T 7/0006; G06T 7/60; G06T 5/92; G06T 2207/20056; G06T 2207/30136; G06V 10/24; G06V 10/431; G06V 10/7715; G06V 2201/06
See application file for complete search history.

(56) References Cited

U.S. PATENT DOCUMENTS 6,516,080 B1 2/2003 Nur
8,170,799 B2 5/2012 Dvorkin et al.
(Continued)

FOREIGN PATENT DOCUMENTS

KR 101871538 B1 6/2018
WO WO-2015024020 A1 * 2/2015 ....... G01N 33/57557

OTHER PUBLICATIONS

Deshpande, Swarnima, A. Kulkarni, S. Sampath, and H. Herman. “Application of image analysis for characterization of porosity in thermal spray coatings and correlation with small angle neutron scattering.” Surface and coatings technology 187, No. 1 (2004): 6-16. (Year: 2004).*

(Continued)

*Primary Examiner* — Carol W Chan
(74) *Attorney, Agent, or Firm* — Shumaker & Sieffert, P.A.

(57) ABSTRACT

A method includes receiving, by a computing device, an image indicative of a cross-section of a thermally-sprayed layer. The thermally-sprayed layer includes a microstructure. The image comprises a matrix of pixels, each pixel in the matrix of pixels defining a respective luminance value. The method includes determining, by the computing device and based on the luminance values of the matrix of pixels, a quantification of a layering of the microstructure of the thermally-sprayed layer.

18 Claims, 18 Drawing Sheets

(51) Int. Cl.

| | |
|---|---|
| ***G06T 7/60*** | (2017.01) |
| ***G06V 10/24*** | (2022.01) |
| ***G06V 10/77*** | (2022.01) |

(56) References Cited

U.S. PATENT DOCUMENTS

| | | | | |
|---|---|---|---|---|
| 9,118,872 | B1 | 8/2015 | Goodman et al. | |
| 10,891,462 | B2 | 1/2021 | Zhao | |
| 11,087,463 | B2 | 8/2021 | Peng | |
| 2011/0170780 | A1* | 7/2011 | Vaddadi | G06V 10/462 382/190 |
| 2015/0159020 | A1* | 6/2015 | Sato | C09D 1/00 106/286.2 |
| 2022/0252757 | A1 | 8/2022 | Alanazi et al. | |

OTHER PUBLICATIONS

Mahendru, Parth, Moussa Tembely, and Ali Dolatabadi. "Artificial intelligence models for analyzing thermally sprayed functional coatings." Journal of Thermal Spray Technology 32, No. 2 (2023): 388-400. (Year: 2023).*

Schorr, Brian S., Kevin J. Stein, and Arnold R. Marder. "Characterization of thermal spray coatings." Materials characterization 42, No. 2-3 (1999): 93-100. (Year: 1999).*

Faraoun, Houda Imane, Thierry Grosdidier, J-L. Seichepine, Daniel Goran, H. Aourag, C. Coddet, J. Zwick, and N. Hopkins. "Improvement of thermally sprayed abradable coating by microstructure control." Surface and Coatings Technology 201, No. 6 (2006): 2303-2312. (Year: 2006).*

Montavon, G., C. Coddet, C. C. Berndt, and S. H. Leigh. "Microstructural index to quantify thermal spray deposit microstructures using image analysis." Journal of Thermal Spray Technology 7, No. 2 (1998): 229-241. (Year: 1998).*

ASTM International, "Standard Test Methods for Determining Area Percentage Porosity in Thermal Sprayed Coatings", Jun. 2023, 8 pp.

Bergant et al., "Porosity Evaluation of Flame-Sprayed and Heat-Treated Nickel-Based Coatings Using Image Analysis", Jan. 27, 2011, 10 pp.

Brandley et al., "Mapping carbon nanotube orientation by fast fourier transform of scanning electron micrographs", Apr. 24, 2018, 10 pp.

Karimi et al., "Effects of remelting processes on porosity of NiCrBSi flame sprayed coatings", Feb. 24, 2016, 8 pp.

Schilcher et al., "Quantifying inhomogeneity of spatial point patterns", Jan. 10, 2017, 17 pp.

U.S. Appl. No. 18/661,009, filed May 10, 2024, naming inventors Krishnamoorthi et al.

U.S. Appl. No. 18/661,042, filed May 10, 2024, naming inventors Krishnamoorthi et al.

* cited by examiner

MICROSTRUCTURAL LAYERING OF THERMAL SPRAY COATING

TECHNICAL FIELD

The disclosure relates to thermal spray techniques, coating systems, and image analysis techniques.

BACKGROUND

Thermal spray systems are used in a wide variety of industrial applications to coat targets with coating material to modify or improve the properties of the target surface. Coatings may include thermal barrier coatings, hard-wear coatings, environmental barrier coatings, or the like. Thermal spray systems use heat generated electrically, by plasma, or by combustion to heat material injected in a plume, so that molten material propelled by the plume contact the surface of the target. Upon impact, the molten material adheres to the target surface, resulting in a coating.

SUMMARY

Thermal spray is a common application technique for metallic and/or ceramic coatings. In a thermal spray process, heat and fast-flowing gas accelerate a powder to at least partially melt and deposit the powder on a surface on the substrate. The melted powder impacts the substrate and flattens, resulting in layers of "splats" to build up the coating layer thickness. The deposited "splats" may solidify into a layer defining a microstructure. The microstructure of the thermally-sprayed coating may include phase particles (e.g., splats or lamellae of thermally-sprayed material). The phase particles may define phase particle boundaries between phase particles. As deposited, the thermally sprayed layer may include primary phase particles of metal and/or ceramic materials and secondary phase particles (e.g., fugitive particles such as polyester or another polymer). The secondary phase particles may be burned out of the thermally-sprayed layer after deposition, resulting in a thermally-sprayed layer that includes phase particles and pores, or void volumes, present between the phase particles. In some cases, pores may be intentionally created to impart a porosity to the thermally-sprayed layer, which may be desirable to impart certain characteristics to the thermally-sprayed layer (e.g., abradability of the thermally-sprayed layer). For example, additives such as graphite and/or polymers may be added as secondary phase particles, and may be burned out to impart the porosity of the coating. As thermal-spray is a layer-by-layer coating process, the microstructure of a thermally-sprayed coating or other thermally-sprayed layer may exhibit patterns in the distribution of the plurality of phase particles and pores that make up the layer.

In some cases, due to improper mixing or other reasons, layering may occur in the thermally-sprayed layer. Layering may happen when phase particles are aligned with other phase particles within the thermally-sprayed layer and/or when pores are aligned with other pores within the thermally-sprayed layer. Such layering may be undesirable, because the thermally-sprayed layer may exhibit anisotropy, where the layer may have reduced strength along the aligned pores and/or phase particle boundaries. The thermally-sprayed layer may delaminate or otherwise fail along the aligned pores and/or phase particle boundaries.

Thermally-sprayed layers with microstructures that are chaotically distributed (e.g., with phase particles and pores randomly distributed) may be more desirable than thermally-sprayed layers which exhibit layering. For example, a thermally-sprayed layer that has a chaotic microstructure may be relatively stronger (e.g., stronger in a loading direction that is perpendicular to a spray direction) and/or be relatively more isotropic than a similar layer with an ordered microstructure.

Since the chaotic or ordered distribution of the microstructure of a thermally sprayed-layer may be indicative of the performance of the layer, it may be desirable to determine and quantify layering of the microstructure of the thermally-sprayed layer. Determining layering characteristics of the thermally-sprayed layer may allow for better understanding of the layer quality, potential failure modes, and/or selective tailoring of the thermal spray process to apply a layer that includes relatively more desirable characteristics. For example, a thermally-sprayed layer which has a relatively more chaotic microstructure may exhibit improved thermal and/or wear resistance when compared to a thermally-sprayed layer which has a relatively ordered microstructure.

Certain techniques for analyzing layering of the microstructure of a thermally-sprayed layer may include capturing and analyzing an image of a cross-section of the thermally-sprayed layer. The image may be compared by a skilled operator to an image of a desired layer to determine whether the microstructure exhibits ordered layers or a chaotic distribution. Several problems may arise with these and other techniques. For example, it may be difficult or impossible to visually determine layering with sufficient precision by visual comparison. Similarly, visual techniques may not allow for quantification of the layering of the microstructure of the thermally-sprayed layer. Thus, quality control and adaptive control of thermal spray processes may be relatively difficult when using such image analysis techniques.

According to one or more examples of the present disclosure, image analysis techniques may be executed, which may allow for further determination and quantification of characteristics and quality of the thermally-sprayed coating layer, and may further allow for selective tailoring of parameters of a thermal spray system (e.g., a thermal spray gun) in the same or in subsequent thermal spray processes. For example, image processing techniques disclosed herein may quantify layering of the microstructure of the thermally-sprayed layer (e.g., as a numerical chaos parameter that may vary from 0, indicating chaos, to 1, indicating ordered layering. The quantification may be used as a quality check of the thermal spray process and/or parts, or may be used to selectively tailor the deposition of the same or a subsequent thermally-sprayed layer.

In accordance with one or more examples of the present disclosure, a method includes receiving, by a computing device, an image indicative of a cross-section of a thermally-sprayed layer, the thermally-sprayed layer comprising a microstructure. The image comprises a matrix of pixels, each pixel in the matrix of pixels defining a respective luminance value. The method of includes determining, by the computing device and based on the luminance values of the matrix of pixels, a quantification of a layering of the microstructure of the thermally-sprayed layer.

In accordance with one or more examples of the present disclosure, a non-transitory computer-readable storage medium has stored thereon instructions that, when executed, configure a processor. The processor is configured to receive an image indicative of a cross-section of a thermally-sprayed layer, the thermally-sprayed layer comprising a microstructure. The image includes a matrix of pixels, each pixel in the matrix of pixels defining a respective luminance value. The processor is further configured to determine, based on the luminance values of the matrix of pixels, a quantification of a layering of the microstructure of the thermally-sprayed layer.

In accordance with one or more examples of the present disclosure, a system includes a thermal spray gun configured to apply a thermally-sprayed layer to a substrate. The system includes an imaging device configured to capture an image indicative of a cross-section of the thermally-sprayed layer, the thermally-sprayed layer comprising a microstructure, wherein the image comprises a matrix of pixels, each pixel in the matrix of pixels defining a respective luminance value. The system includes a computing device configured to receive an image indicative of a cross-section of the thermally-sprayed layer. The computing device is further configured to determine, based on the luminance values of the matrix of pixels, a quantification of a layering of the microstructure of the thermally-sprayed layer.

The details of one or more examples are set forth in the accompanying drawings and the description below. Other features, objects, and advantages will be apparent from the description and drawings, and from the claims.

DETAILED DESCRIPTION

Figure 1B:
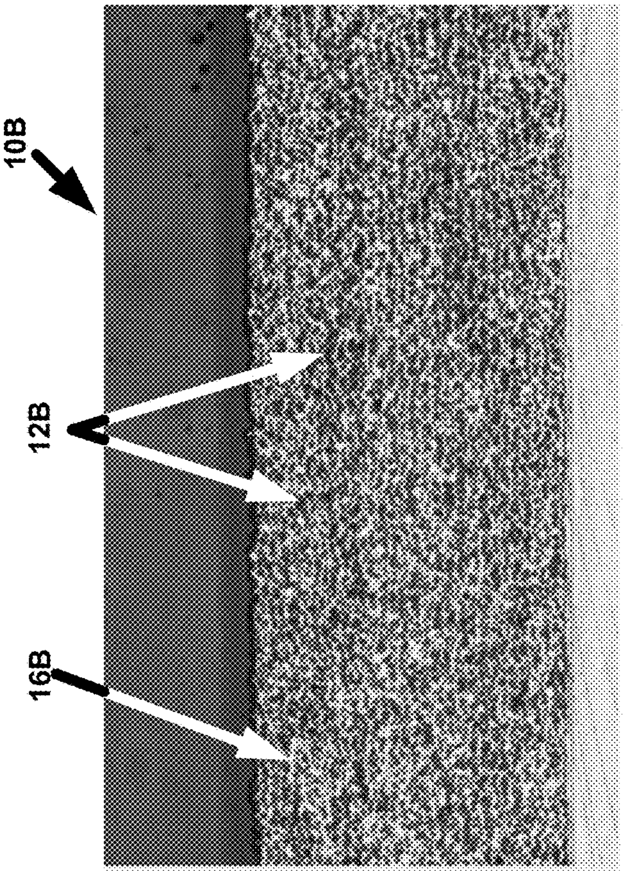
FIGS. 1A and 1B are micrographs illustrating cross-sections of two example thermally-sprayed layers, each thermally-sprayed layer exhibiting microstructure, according to one or more examples of the present disclosure.

The disclosure describes systems and techniques for analyzing an image of a thermally-sprayed layer ("layer") to determine one or more attributes of the layer. The layer may be a coating layer, which may be applied by a thermal spray system that includes a thermal spray gun. Thermally-sprayed layers of the present disclosure may include metallic and/or ceramic materials, and may be formed as thermal barrier coatings, hard-wear coatings, environmental barrier coatings, abradable coatings, or the like. Such coatings may have applications in the aerospace industry, such as on portions of gas turbine engines. Thermally-sprayed coating layers of the present disclosure may be bond coats, thermal and/or environmental barrier coating layers, abradable layers, or the like.

During a thermal spray process, the spray gun receives spray material (e.g., a powder or mixture of powders and/or binders and/or fugitive materials) and a carrier gas, at least partially melts the spray material, and directs the at least partially melted spray material toward a spray target using the carrier gas. The at least partially melted spray material contacts the spray target to provide a coating of the spray material on the spray target. In some examples, the quality of the coating on the spray target may depend on process attributes including, for instance, the spray material composition and flow rate; the carrier gas composition, temperature, and flow rate; the spray target composition and shape; the condition of the at least one component (e.g., the spray gun); and the like. Unsatisfactory characteristics may result from variances in process attributes, including process parameters, component wear, or both.

The melted spray material impacts the substrate and flattens, resulting in individual phase particles of spray material depositing as "splats" to build up the layer thickness. The resulting microstructure of the layer may include phase particles (e.g., primary phase particles such as lamellae or flattened powders of metallic and/or ceramic spray material) and void volumes (e.g., closed pores, open pores, splat lines, or other empty spaces within the layer). The void volumes, in total, may be called the porosity of the layer, and may be expressed as a volume percentage or a void fraction of the layer. The void volumes may form during a thermal spray process, such as when fugitive materials (e.g., secondary phase particles) may volatilize during a burnout phase. The microstructure of the layer may generally be described as the arrangement of phases, components, and/or defects in the layer.

The thermal spray process may be designed to impart a target porosity to the layer. The porosity may impart desirable properties to the layer, such as certain abrasion resistance, failure modes, and/or thermal resistance or transfer properties. Accordingly, secondary phase particles (e.g., fugitive materials) may be added to the primary phase particles (e.g., metal and/or ceramic powders) at a controlled rate. Generally, it may be desirable to add fugitive materials evenly and proper mixing, such that the porosity of the resulting layer is spatially homogenous and/or distributed with substantially uniform pore sizes. A polymer burnout step may follow the thermal spray process, which may remove the fugitive materials and leave void volumes in the deposited layer.

Improper mixing, unpredictable turbulent carrier gas flows, the layer-by-layer nature of other process variable may cause the microstructure of the layer to present as independent sub-layers. For example, phase particles (e.g., primary phase particles) and/or pores within the layer may align in an orderly fashion, resulting in layering of the microstructure of the layer. Layering may be undesirable, because the layer may be susceptible to delaminate or otherwise fail and break at the interface between sub-layers. For example, pores may align perpendicular to the spray direction, and the layer may be weaker along the aligned pores because relatively less material may be present along the aligned pores.

It may be desirable to determine and quantify layering of the microstructure of the layer to predict material properties of the layer. Certain techniques for analyzing layering may include capturing and analyzing an image of a cross-section of the layer. In such techniques, the image may be compared by a skilled operator to an image of a desired layer, and the skilled operator may estimate any layering of the microstructure. However, such techniques may undesirably introduce variance between different operators, introducing human error to the quantification of layering of the microstructure.

According to one or more examples of the present disclosure, image analysis techniques may be executed by a computing device, which may allow for further analysis of characteristics and quality of the layer, and may further allow for selective tailoring of parameters of a thermal spray system (e.g., a thermal spray gun) in the same or in subsequent thermal spray processes. In techniques according to the present disclosure, an image processing technique may include receiving, by a computing device, an image of a cross-section of a layer. The layer includes a microstructure. The received image includes a matrix of pixels, and each pixel of the matrix of pixels defines a respective luminance value of a plurality of luminance values. The computing device may determine, based on the luminance values of the matrix of pixels, a quantification of a layering of the microstructure of the layer. In some examples, the quantification may be a numeric index, such as a numeric chaos parameter.

In some examples, the microstructure of the layer includes a plurality of phase particles. The phase particles may be primary phase particles of metallic and/or ceramic spray material. The phase particles may be individual units of spray material, each individual phase particle defining phase particle boundaries. Layering may be indicative of alignment of the plurality of phase particles with each other in layers. The computing device may determine a pattern in a distribution of the phase particles to determine the quantification of layering of the microstructure. For example, phase particles (e.g., primary phase particles comprising metallic and/or ceramic particles) may be captured in the image as pixels with relatively high luminance values while void volumes (e.g., pores) may be captured in the image as pixels with relatively low luminance values. Image analysis techniques according to the present disclosure may be based on the difference in luminance values of pixels indicative of phase particles and pixels indicative of pores.

In some examples, to determine the pattern in the plurality of phase particles in the layer, the computing device performs a Fast Fourier Transform (FFT) on the image. The received image, indicative of the cross-section of the layer, may be a spatial domain image. The spatial domain image is indicative of the position in space of the phase particles and pores making up the layer. In performing the FFT, the computing device may generate a second image. The second image may be indicative of a frequency domain. In some examples, the frequency domain image may be made up of a second matrix of pixels equal in size to the first matrix of pixels making up the received image.

In some examples, the computing device performs the FFT as a two-dimensional FFT. The FFT may generate the spatial domain image initially received as a summation of cosine-like images. In some examples, the spatial domain image may have a coordinate system with an X-axis and a Y-axis. In some examples, the frequency domain image may have a coordinate system where a u-axis runs horizontally through the middle of the frequency domain image and a v-axis runs vertically through the middle of the frequency domain image. In some examples, the second image, or frequency domain image, may include a bright dot in the center of the image at the origin of the coordinate system which represents the frequency term or average value. High frequencies in a vertical direction of the spatial domain image may lead to bright dots displaced from the bright dot in the center of the frequency domain image in a vertical direction. Similarly, high frequencies in a horizontal of the spatial domain image may lead to bright dots displaced from the bright dot in the center of the frequency domain image in a vertical direction.

In some examples of the present disclosure, the computing device generates a circle in the second image (e.g., by modifying the second image by superimposing or adding a circle). The circle may have a center point at the intersection of the u-axis and a v-axis (e.g., the origin point of the coordinate system of the frequency domain image). The computing device may generate an intensity value parameter by summing the luminance values of each pixel along a line segment from the center point of the circle to the circumference of the circle. In some examples, the computing device may generate a plurality of intensity value parameters (e.g., a second intensity value parameter, a third intensity value parameter, a fourth intensity value parameter, and the like). In some examples, intensity value parameters may be generated in both vertical and horizontal directions. The intensity value parameters generated by summing pixels in a vertical direction may be compared to the intensity value parameters generated in a horizontal direction to determine a chaos parameter. The chaos parameter may be a quantification of the layering of the microstructure of the layer. Determining a chaos parameter by comparing the intensity value parameters generated by summing pixels along line segments in a vertical direction and intensity value parameters generated by summing pixels along line segments in a horizontal direction may be advantageous. For example, determining a chaos parameter in this way may allow for determining layering in a direction parallel to a surface of the substrate (e.g., orthogonal to a spray direction), while also limiting computing power.

The chaos parameter may be determined in other ways. For example, the computing device may generate a plurality of intensity value parameters by summing the luminance values of each pixel along each line segment of a plurality of line segments. Each line segment may be formed between the center point of the circle and the circumference of the circle. In some examples, the plurality of line segments may consist of 360 line segments, with each line segment displaced from every other line segment by an angle of about one degree. For example, intensity value parameters may be generated at all angles of the circle (0 to 360 degrees), and then the computing device may plot the plurality of intensity value parameters against the angle within the circle that the radial sum is performed. The computing device may determine a peak intensity value parameter of the plurality of intensity value parameters of the chart. The computing device may add the peak intensity value parameter to an intensity value parameter of the plurality of intensity value parameters that is separated by 180 degrees from the peak intensity value parameter and dividing by two to determine a numerator. The computing device may add the peak intensity value parameter to three different intensity value parameters of the plurality of intensity value parameters and dividing by two to determine a denominator, wherein the three different intensity value parameters are separated from the peak intensity value parameters by 90 degrees, 90 degrees, and 180 degrees, respectively. The computing device may determine the chaos parameter by dividing the numerator by the denominator. In this way, the computing device may quantify layering, regardless of the angle with which the image was captured or the directionality of layering within the layer.

In some examples, before the computing device executes the image analysis technique, the computing device executes one or may functions designed to clean up the image for further analysis. For example, the computing device may optionally normalize the image to correct for any sharp light gradients in the image which may be present from uneven illumination, generating a grayscale image. A normalization step may be applicable when the image is captured by optical microscopy. In some examples, techniques disclosed herein may also include converting, by the computing device and based on the luminance values, the image into a binary image. The described techniques may be performed automatically by the computing device, which may improve the accuracy and/or speed with which the porosity of the layer may be determined.

In some examples, the image indicative of a cross-section of the layer received by the computing device includes a matrix of individual pixels. The image may be a captured through scanning electron microscopy (SEM), and may be in black and white. Alternatively, the image may be captured as an optical micrograph, and may be in color (e.g., include additional colors to black and white). Each pixel in the matrix of pixels may define a luminance value. The luminance value may be the brightness intensity. In some examples, the brightness intensity may range from a luminance value of zero to indicate a black color to a luminance value of, for example, 255 to indicate a white color. Other scales of luminance values are also considered. Further, other examples are also considered, such as where the maximum luminance value is indicative of a black color and the minimum luminance value is indicative of a white color. In examples where the image is a color image, each pixel in the matrix of pixels may include a luminance value for each of a red color, a yellow color, and a blue color. The technique may include determining an overall luminance value by, for example, summing or averaging the luminance values for each of the red color, the yellow color, and the blue color. The technique may then proceed based on the determined overall luminance value.

In some examples, the image optionally is normalized to reduce or eliminate any brightness gradients that may result from the way the image is captured or other artificial means. For example, a camera flash may cause a central portion of the image to appear brighter than the perimeter of the image, and normalizing the image may correct for the camera flash. In some examples, normalizing the image may include adjusting, by the computing device, a luminance value of at least one pixel of the matrix of pixels. For example, adjusting the luminance value of at least one pixel may include determining a background luminance value for each individual pixel in the matrix of pixels, and subtracting the background luminance value from each individual pixel luminance value. The resulting normalized image may be called a grayscale image. Analysis of the grayscale image, with color removed and/or brightness gradients minimized, may result in a more accurate representation of the layer in the image relative to techniques which do not include a normalization step, because the grayscale image may correct for non-uniform illumination of the cross-section of the coating layer by reducing or eliminating brightness gradients. In some examples, the computing device may generate the grayscale image prior to determining the pixel(s) that correspond to the void volumes(s) in the layer. Thus, further analysis of the image may be performed on an image that is relatively free of noise introduced through non-uniform illumination.

In some examples, the computing device may optionally convert the image into a binary image. In some examples, to convert an image into a binary image, the computing device may assign each pixel in the matrix of pixels making up to a luminance value that is equal to a luminance value of a black color or a luminance value that is equal to a white color. By way of example, if the scale of luminance values ranges from zero to 255, those pixels that have a luminance value from zero to 127 may be adjusted to have a luminance value of zero. Accordingly, those pixels that have a luminance value from 128 to 255 may be adjusted to have a luminance value of 255. In this way, an image may be converted into a binary image consisting of only pixels that are white or black. In some cases, the image analysis technique to quantify the layering of the microstructure may be performed on the binary image.

In many cases, the computing device which performs the image analysis is a standalone computing device. The standalone computing device may perform the image analysis offline, that is, separately from the thermal spray system. Results of the image analysis may be used to make determinations about the quality of the layer and/or parameters of the thermal spray system which applied or is applying the layer. However, it is also considered that the computing device which performs the image analysis may be an integrated part of a thermal spray system which includes a thermal spray gun configured to apply a thermally-sprayed coating layer to a substrate and an imaging device. In such cases, the computing device may perform the image analysis and feedback results which may be used to control the thermal spray process. For example, the computing device may control (e.g., adjust) one or more parameters of the thermal spray gun based at least partially on the determined quantification of the layering of the microstructure of the layer. In some examples, the computing device may compare the determined chaos parameter to a threshold chaos parameter, and responsive to determining that the determined chaos parameter exceeds the threshold chaos parameter, controlling, by the computing device, at least one parameter of a thermal spray gun configured to apply the thermally-sprayed coating. In this way, thermal spray systems may be controlled based on the disclosed image techniques, which may allow for fabrication of parts with increased quality relative to systems which are not controlled based on the layering of the microstructure of the layer.

Figure 1A:
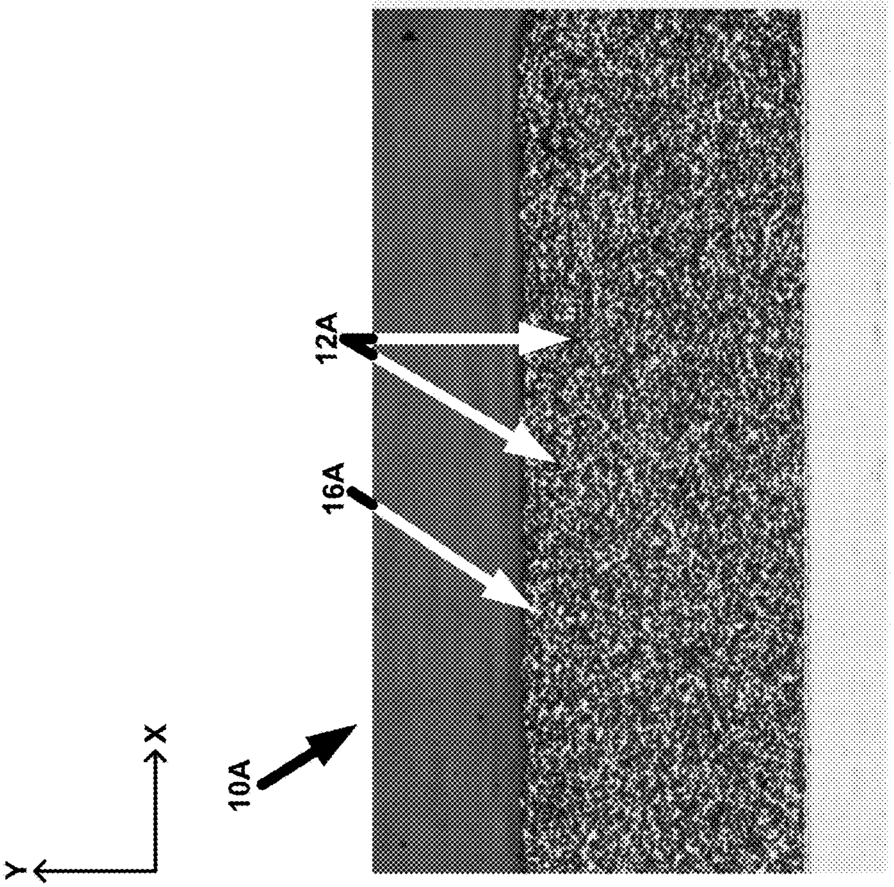

FIGS. 1A and 1B are micrographs illustrating cross-sections of two example thermally-sprayed layers, 10A, and 10B, respectively. Although, primarily described below with respect to layer 10A of FIG. 1A, the description of layer 10A of FIG. 1A also applies to layer 10B of FIG. 1B, except where explicitly described as differing.

FIG. 1A is a conceptual diagram illustrates an image indicative of a cross-section of a thermally-sprayed layer 10A. Layer 10A is applied by a thermal spray system (for example, similar to thermal spray system 100 described with reference to FIG. 2). The thermal spray system may include an imaging device configured to capture the image of FIG. 1A and a computing device configured to analyze the image to determine a porosity of layer 10A. Layer 10A may be a bond coat, a primer coat, a hard coat, a wear-resistant coating, a thermal barrier coating, an environmental barrier coating, an abradable coating layer or the like. As such, layer 10A may be a top or outer coating that is exposed to the environment, or may be an underlayer that is not exposed to the environment and has other coating layer formed on layer 10A. Layer 10A may be formed as part of a high-temperature mechanical system such as a gas turbine engine. In some examples, layer 10A may be in a range of from about 10 micrometers to about 5,000 micrometers in thickness. As such, a cross-sectional image like the one conceptually illustrated in FIG. 1A may be taken under magnification by an imaging device of the thermal spray system.

The thermal spray system may direct a powder with heat and carrier gases at a substrate to form layer 10A. The powder may at least partially melt during flight, and may flatten upon impact and adhere as phase particles 16A. Layer 10A includes pores 12A. Pores 12A are void volumes within layer 10A. Performance and material properties of layer 10A may depend on the relative fraction of phase particles 16A, the relative fraction of pores 12A, and the order with which phase particles 16A and pores 12A are distributed, e.g., whether pores 12A and/or phase particles 16A are aligned in ordered layers (as in layer 10B of FIG. 1B) throughout layer 10A or chaotically distributed throughout layer 10A (as in layer 10A of FIG. 1A)). The amount of layering of the microstructure may impact the performance of layer 10A. As such, measuring and quantifying these or similar parameters of layer 10A may facilitate evaluating the performance of layer 10A.

One way to measure the layering of the microstructure of FIG. 10A is to analyze an image of a cross-section of layer 10A like the image of FIG. 1A. The image of FIG. 1A is a two-dimensional image of a cross-section of layer 10A. The image of FIG. 1A may be generated according to a sampling procedure. The sampling procedure may involve sampling layer 10A, cutting into layer 10A, and capturing an image representative of a cross-section of layer 10A with an imaging device. Sampling may occur on a temporal basis (e.g., every 1 minute of operation of system 10, every 5 minutes, or the like), or on an area basis of layer 10A (e.g., 1 square centimeter of layer 10 may be removed for imaging and analysis from every square meter of layer 10, or the like), or on a job basis (e.g., every third coated part is inspected by image processing techniques to determine a quantification of the layering of the microstructure of layer 10A, or the like).

A computing device may analyze the two-dimensional image of FIG. 1A to determine a porosity of layer 10A. For example, the received image may consist of a matrix of pixels. Each individual pixel in the matrix of pixels may define a luminance value. The computing device may determine, based on the luminance value, a quantification of a layering of the microstructure of the thermally sprayed layer. As will be described further below, in some examples the quantification of layering of the microstructure may be a chaos parameter. In some examples, the chaos parameter may range from 0, indicative of a chaotic microstructure with no or limited layering to 1, indicative of a perfectly ordered layered microstructure.

In certain techniques, the image of FIG. 1A is analyzed to determine layering of layer 10A without generating a quantification of layering. For example, a skilled operator may compare the image to an image with an acceptable chaotic microstructure. In these examples, the skilled operator may not precisely estimate the layering of the microstructure of layer 10A.

FIG. 1B is a conceptual diagram illustrates an image indicative of a cross-section of a thermally-sprayed layer 10B. Layer 10B may have a similar total porosity to layer 10A of FIG. 1A. However, unlike phase particles 16A of layer 10A, phase particles 16B may be aligned with other phase particles in sub-layers and/or pores 12B may be aligned with each other in sub-layers of layer 10B to have a different spatial distribution of pores 12B than pores 12A of layer 10A. Although a visual comparison of example layers 10A and 10B may allow an operator to determine that layer 10B has a more ordered microstructure than layer 10A, it may be difficult or impossible to visually quantify layering of the porosity of layers 10A, 10B with precision and accuracy.

Figure 2:
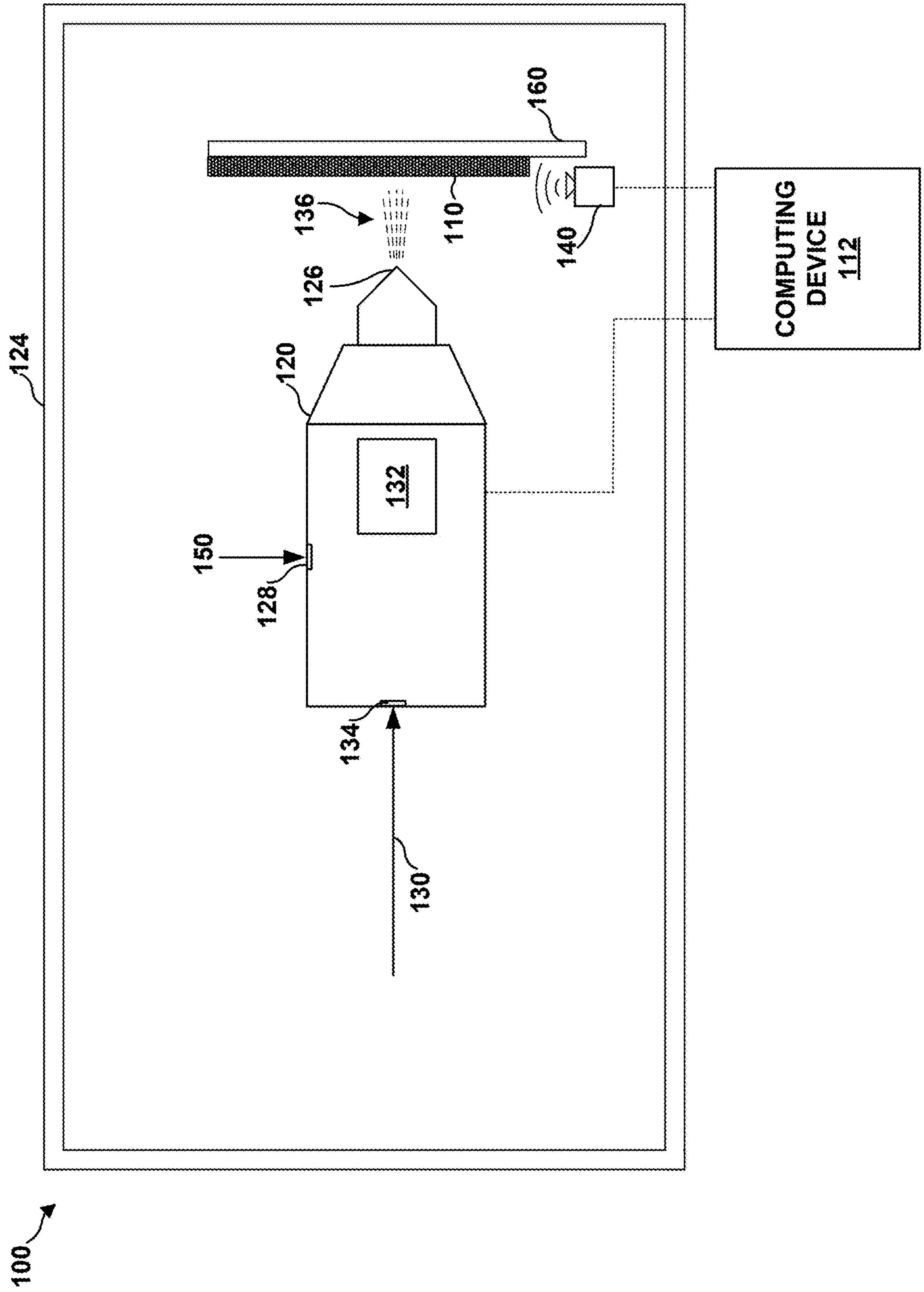
FIG. 2 is a conceptual block diagram illustrating a thermal spray system including an imaging device and a computing device for analyzing a thermally-sprayed layer generated by a thermal spray system, according to one or more examples of the present disclosure.

FIG. 2 is a conceptual block diagram illustrating an example thermal spray system 100 for forming a layer 110. In some examples, thermal spray system 100 includes components such as an enclosure 124, a thermal spray gun 120, imaging device 140, and a computing device 112. System 100 of FIG. 2 may be an example of the thermal spray system used to form layers 10A, 10B of FIGS. 1A and 1B, and may be capable of capturing the cross-sectional image of FIGS. 1A and 1B.

Enclosure 124 encloses some components of thermal spray system 100, including, for example, thermal spray gun 120 and imaging device 140. In some examples, enclosure 124 substantially completely surrounds thermal spray gun 120 and imaging device 140 and encloses an atmosphere. The atmosphere may include, for example, air, an inert atmosphere, a vacuum, or the like. In some examples, the atmosphere may be selected based on the type (e.g., composition) of coating being applied using thermal spray system 100. Enclosure 124 also encloses a spray target 160, to which layer 110 is applied.

Spray target 160 includes a substrate to be coated with layer 110 using thermal spray system 100. In some examples, spray target 160 includes a component used in any one or more mechanical systems, including, for example, a high temperature mechanical system such as a gas turbine engine. In such examples, layer 110 may be a bond coat, a primer coat, a hard coat, a wear-resistant coating, a thermal barrier coating, an environmental barrier coating, or the like. Layer 110 may be all or part of a coating system. Spray target 160 may include a substrate or body of any regular or irregular shape, geometry or configuration. In some examples, spray target 160 may include metal, plastic, glass, or the like.

Thermal spray gun 120 is coupled to a gas feed line 130 via gas inlet port 134, and to a spray material feed line 150 via a material inlet port 128. Gas feed line 130 provides a gas flow to gas inlet port 134 of thermal spray gun 120. Depending upon the type of thermal spray process being performed, the gas flow may be a carrier gas for the coating material, may be a fuel that is ignited to at least partially melt the coating material, or both. Gas feed line 130 may be coupled to a gas source (not shown) that is external to enclosure 124.

Material inlet port 128 is coupled to spray material feed line 150. Material feed line 150 may be coupled to a material source (not shown) that is located external to enclosure 124. Coating material may be fed through material feed line 150 in powder form (e.g., as primary phase particles of metallic and/or ceramic particles and secondary phase powders of fugitive materials such as polymeric powders), and may mix with gas from gas feed line 130 within thermal spray gun 120. The composition of the coating material may be based upon the composition of the coating to be deposited on spray target 160, and may include, for example, a metal, an alloy, a ceramic, combinations thereof, or the like. The composition of coating material may include additives configure to impart properties to layer 110. Such additives may include fugitive materials intended to volatilize to impart porosity to layer 110. Other additives may include graphite for lubrication.

Thermal spray gun 120 also includes energy source 132. Energy source 132 provides energy to at least partially melt the coating material from coating material provided through material inlet port 128. In some examples, energy source 132 includes a plasma electrode, which may energize gas provided through gas feed line 130 to form a plasma. In other examples, energy source 132 includes an electrode that ignites gas provided through gas feed line 130.

As shown in FIG. 2, an exit flowstream 136 exits outlet 126 of thermal spray gun 120. In some examples, outlet 126 includes a spray gun nozzle. Exit flowstream 136 may include at least partially melted coating material carried by a carrier gas. Outlet 126 may be configured and positioned to direct the at least partially melted coating material at spray target 160.

Thermal spray system 100 includes at least one imaging device 140. Imaging device 140 is configured to capture image data representative of a cross-section of layer 110. In some examples, imaging device 140 may include a scanning electron microscope (SEM) or a visual camera with optical microscopy equipment. As such, imaging device 140 may include optical equipment (lenses, mirrors, or the like) configured to capture the image as a micrograph. The imaging device may further include illumination equipment configured to illuminate layer 110 to capture the image data at a plurality of different luminance values. Imaging device 140 may be configured to capture, store, and/or transmit the image data as an image including a matrix of pixels. Each pixel in the matrix of pixels may define at least one luminance value. The luminance value may be indicative of the image intensity or brightness.

In some examples, the image may be a black and white image. Put differently, the image may not include colors other than black and white. In such examples, each pixel in the matrix of pixels may define a single luminance value. In some cases, the luminance value is in a range from 0 to 255, where 0 corresponds to a black color, 255 corresponds to a white color, and the intervening numbers correspond to shades of gray between black and white. Generally, images captured through SEM may be black and white images.

Additionally, or alternatively, imaging device 140 may capture the image as a color image. Generally, images captured through optical microscopy may be color images. A color image may include colors other than black and white. In some color images, each pixel in the matrix of pixels may define a luminance value for each of a red color, a blue color, and a yellow color. The luminance values for each of red, green, and yellow may be scaled similarly to those described above. Alternative or additional color matrices are also considered.

Computing device 112 may be configured to control operation of one or more components of thermal spray system 100 automatically or under control of a user. For example, computing device 112 may be configured to control operation of thermal spray gun 120, gas feed line 130 (and the source of gas-to-gas feed line 130), material feed line 150 (and the source of material-to-material feed line 150), at least one imaging device 140, and the like. Computing device 112 also may be configured to receive at least one image of a cross-section of layer 110 (e.g., similar to as shown in FIG. 1) from at least one imaging device 140 and analyze and/or process the at least one image to determine the layering of the microstructure and/or other characteristics of layer 110. The determined layering of the microstructure and/or other characteristics of layer 110 may be used to determine and/or control one or more process attributes of thermal spray system 100.

During a thermal spray process, thermal spray system 100 performs at least one process, such as depositing layer 110 on spray target 160. Thermal spray system 100 and the thermal spray process performed by thermal spray system 100 possess a plurality of process attributes. In some examples, computing device 112 may store a desired target chaos parameter for layer 110 as a quantification of the layering of the porosity of the microstructure of layer 110. Computing device 112 may compare the determined chaos parameter to a threshold chaos parameter. Responsive to determining that the determined chaos parameter exceeds the threshold chaos parameter, computing device 112 may execute one or more actions. For example, computing device 112 may generate an output (e.g., by adding a tag to the image) which is indicative of the need for further inspection of layer 110 represented in the image. Further inspection may result in rework or discarding of spray target 160. Alternatively, or additionally to tagging the image, computing device 112 may stop deposition of layer 110 for inspection of system 100. Parameters of thermal spray gun 120 that are controlled and may be adjusted by computing device 112 may include process parameters such as at least one of a temperature, a pressure, a mass flow rate, a volumetric flow rate, a molecular flow rate, a molar flow rate, a composition or a concentration, of a flowstream flowing through thermal spray system 100, for instance, of gas flowing through gas feed line 130, or of exit flowstream 136, or of material flowing through material feed line 150.

Figure 3:
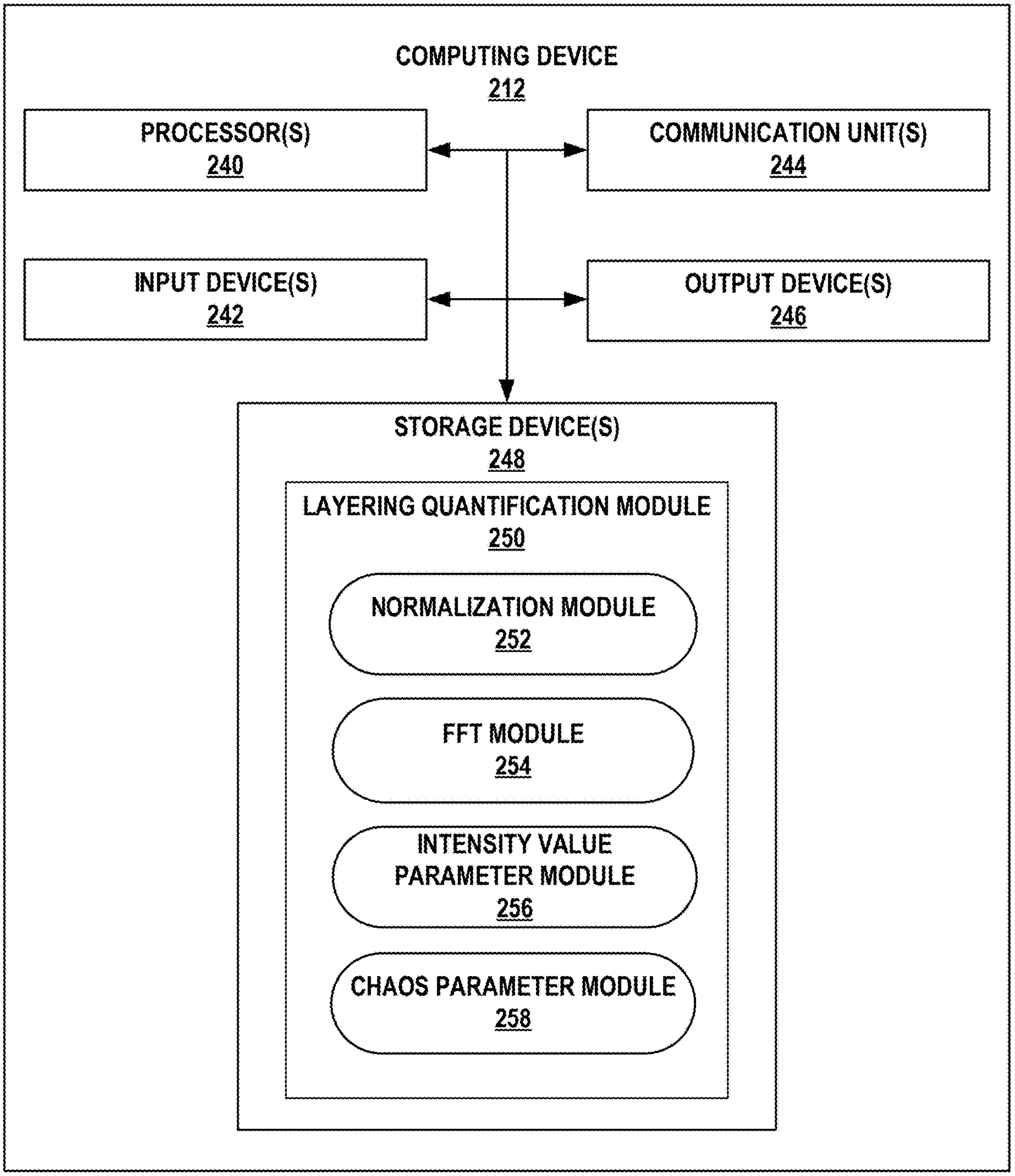
FIG. 3 is a conceptual block diagram illustrating an example of a computing device for analyzing an image representative of a thermally-sprayed layer, according to one or more examples of the present disclosure.

FIG. 3 is a conceptual block diagram illustrating an example of a computing device 212. Computing device 212 of FIG. 3 may be an example of computing device 112 of FIG. 2. In some examples, computing device 212 may include, for example, a desktop computer, a laptop computer, a workstation, a server, a mainframe, a cloud computing system, or the like. In some examples, computing device 212 may control the operation of system 100 of FIG. 2, including, for example, thermal spray gun 120, energy source 132, entry flowstream 130, exit flowstream 136, imaging device 140, spray material feed 150, and spray target 160. In other examples, computing device 212 may be separate from the rest of a thermal spray system, and may be configured only to process a captured image of a layer such as layer 10A or 10B of FIG. 1 or layer 110 of FIG. 2.

In the example illustrated in FIG. 3, computing device 212 includes one or more processors 240, one or more input devices 242, one or more communication units 244, one or more output devices 246, and one or more storage devices 248. In some examples, one or more storage devices 248 stores layer quantification module 250. In other examples, computing device 212 may include additional components or fewer components than those illustrated in FIG. 2.

One or more processors 240 are configured to implement functionality and/or process instructions for execution within computing device 212. For example, processors 240 may be capable of processing instructions stored by storage device 248. Examples of one or more processors 240 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 248 may be configured to store information within computing device 212 during operation. Storage devices 248, in some examples, include a computer-readable storage medium or computer-readable storage device. In some examples, storage devices 248 include a temporary memory, meaning that a primary purpose of storage device 248 is not long-term storage. Storage devices 248, in some examples, include a volatile memory, meaning that storage device 248 does not maintain stored contents when power is not provided to storage device 248. Examples of volatile memories include random access memories (RAM), dynamic random access memories (DRAM), static random access memories (SRAM), and other forms of volatile memories known in the art. In some examples, storage devices 248 are used to store program instructions for execution by processors 240. Storage devices 248, in some examples, are used by software or applications running on computing device 212 to temporarily store information during program execution.

In some examples, storage devices 248 may further include one or more storage device 248 configured for longer-term storage of information. In some examples, storage devices 248 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 212 further includes one or more communication units 244. Computing device 212 may utilize communication units 244 to communicate with external devices (e.g., thermal spray gun 120, entry flowstream 130, exit flowstream 136, acoustic sensor 140, spray material 150, and spray target 160) via one or more networks, such as one or more wired or wireless networks. Communication unit 244 may include a network interface card, such as an Ethernet card, an optical transceiver, a radio frequency transceiver, or any other type of device that can send and receive information. Other examples of such network interfaces may include Wi-Fi radios or Universal Serial Bus (USB). In some examples, computing device 212 utilizes communication units 244 to wirelessly communicate with an external device such as a server.

Computing device 212 also includes one or more input devices 242. Input devices 242, in some examples, are configured to receive input from a user through tactile, audio, or video sources. Examples of input devices 242 include a mouse, a keyboard, a voice responsive system, video camera, microphone, touchscreen, or any other type of device for detecting a command from a user.

Computing device 212 may further include one or more output devices 246. Output devices 246, in some examples, are configured to provide output to a user using audio or video media. For example, output devices 246 may include a display, a sound card, a video graphics adapter card, or any other type of device for converting a signal into an appropriate form understandable to humans or machines. In some examples, computing device 212 outputs a representation of the image data captured by imaging device 140.

In some examples, computing device 212 may generate an alert in response to a determination of a state of system 100 or layer 110, via output devices 246. For example, computing device 212 may generate auditory signals, such as a beep, an alert tone, or an alerting sound, or visual signals, such as an icon on a display, flashing lights, or a combination of visual and audible signals, to indicate a process variance or a process parameter deviation. For example, the alert may be generated in response to a determination by computing device 212 that layer 110 exhibits layering of the microstructure (e.g., a chaos parameter) that exceeds a threshold, where a higher number indicates a more ordered microstructural layering. In some examples, an operator may thus be alerted, and may choose to investigate thermal spray system 100. As another example, computing device 212 may generate an alert that is transmitted over a network to another computing device, including a hand-held computing device, for instance, a cellphone. The alert signal may include information about a parameter of layer 110 parameter or a process parameter.

Storage devices 248 of computing device 212 may include layering quantification module 250. In some examples, layering quantification module 250 processes the image or images captured by imaging device 140 to determine the layering of the microstructure of layer 110, and may output a quantification of the layering of the microstructure, for example as a chaos parameter. To determine these characteristics of layer 110, layering quantification module 250 may include sub-modules configured to execute specific functions on the received image. Functions performed by normalization module 252, FFT module 254, intensity value parameter module 256, and chaos parameter module 258 are explained below with reference to the example flow diagram illustrated in FIG. 4.

Layering quantification module 250 and its sub-modules by normalization module 252, FFT module 254, intensity value parameter module 256, and chaos parameter module 258 may be implemented in various ways. For example, by normalization module 252, FFT module 254, intensity value parameter module 256, and chaos parameter module 258 may be implemented as software, such as an executable application or an operating system, or firmware executed by one or more processors 240. In other examples, by normalization module 252, FFT module 254, intensity value parameter module 256, and chaos parameter module 258 may be implemented as part of a hardware unit of computing device 212.

Computing device 212 may include additional components that, for clarity, are not shown in FIG. 3. For example, computing device 212 may include a power supply to provide power to the components of computing device 212. Similarly, the components of computing device 212 shown in FIG. 3 may not be necessary in every example of computing device 212.

Figure 4:
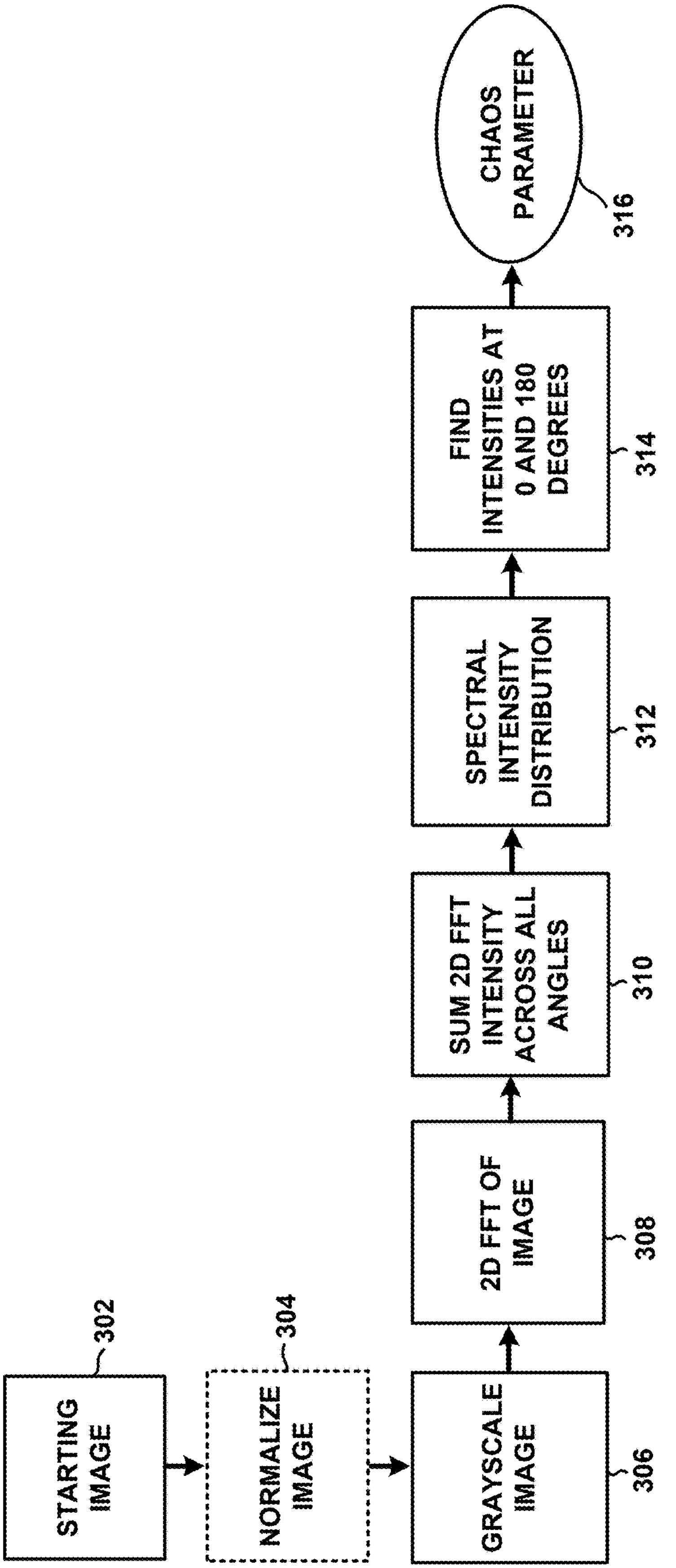
FIG. 4 is a flow diagram illustrating a technique for quantifying a layering of the microstructure of a thermal-sprayed layer, according to one or more examples of the present disclosure.

Examples of layer 10A, thermal spray system 100, and computing device 212 are described with reference to FIGS. 1A-3 above. The technique of FIG. 4 is described with reference to an example image of layer 10A of FIG. 1A and system 100 of FIG. 2 as processed by computing device 212 of FIG. 3.

Computing device 212 may receive the image of FIG. 1A (302). The image of FIG. 1A may be the raw image captured by imaging device 140, and may be representative of a cross-section of layer 110 deposited by thermal spray system 100. The received image may include a matrix of pixels, with each pixel in the matrix having a luminance value.

Normalization module 252 may optionally normalize the image of FIG. 1A (304), resulting in a grayscale image (306). Normalization module 252 may remove colors other than black and white from the received image in examples where the received image is a color image to generate a grayscale image. Each pixel in the matrix of pixels may define a luminance value. The luminance value may be the brightness intensity. In some examples, the brightness intensity may range from a luminance value of zero to indicate a black color to a luminance value of, for example, 255 to indicate a white color. Other scales of luminance values are also considered. Further, other examples are also considered, such as where the maximum luminance value is indicative of a black color and the minimum luminance value is indicative of a white color. In examples where the image of FIG. 1A is a color image, each pixel in the matrix of pixels may include a luminance value for each of a red color, a yellow color, and a blue color. In such examples, normalization module 252 may remove the color and assign an overall luminance value to the pixel on black and white scale. Normalization module 252 may determine an overall luminance value for each pixel by, for example, summing or averaging the luminance values for each of the red color, the yellow color, and the blue color.

Normalization module 252 may normalize the image of FIG. 1A to generate the grayscale image. The grayscale image may have reduced brightness gradients that may result from the way the image is captured or other artificial means. For example, a camera flash may cause a central portion of the image to appear brighter than the perimeter of the image, and normalizing the image may correct for the camera flash. In some examples, normalizing the image may include adjusting, by normalization module 252, the luminance value of at least one pixel of the matrix of pixels. For example, adjusting the luminance value of at least one pixel may include determining a background luminance value for each individual pixel in the matrix of pixels, and subtracting the background luminance value from each individual pixel luminance value to create the grayscale image. The resulting grayscale image may result in a more accurate representation of layer 10A in the image relative to techniques which do not employ normalization module 252, because the grayscale image may correct for non-uniform illumination of the cross-section of layer 10A by reducing or eliminating brightness gradients. Normalization module 252 may generate the grayscale image by normalizing and/or removing color from the raw image. Layering quantification module 250 may execute normalization module 252 to generate the grayscale image prior to further analyzing the image to quantify layering layer 10A. Thus, further analysis of the image may be performed on an image that is relatively free of noise introduced through non-uniform illumination.

In some examples, normalization module 252 generates the grayscale image as a binary image. In such examples, normalization module 252 may assign each pixel in the matrix of pixels in the image to a luminance value that is equal to a luminance value of a black color or a luminance value that is equal to a white color. By way of example, if the scale of luminance values ranges from zero to 255, those pixels that have a luminance value from zero to 127 may be adjusted to have a luminance value of zero by binary conversion module 256. Accordingly, those pixels that have a luminance value from 128 to 255 may be adjusted to have a luminance value of 255. In this way, normalization module 252 may convert the received image of FIG. 1A into a binary image consisting of only pixels that are white or black. In this way, the received image of FIG. 1A may be converted into an image with each pixel clearly indicative of metal, alloy, or ceramic components of phase particles 16A of layer 10A or void spaces of pores 12A.

Layering quantification module 250 may execute Fast Fourier Transform (FFT) module 254 to seek a pattern in a distribution of the plurality of phase particles 16A making up layer 10A (308). In some examples, the received image of FIG. 1A is a first image. As illustrated in FIG. 1A, the first image is a spatial domain image. For example, the image indicates the position of phase particles 16A and pores 12A in space within layer 10A. Execution of FFT module 254 may causing computing device 112 to generate a second image indicative of a frequency domain. In some examples, FFT module 254 may be a 2-dimensional FFT. In some examples, FFT module 254 may generate a second image made up of a second matrix of pixels equal in size to the first matrix of pixels of the first received image. Each pixel in the second matrix of pixels may define a luminance value indicative of a total amount of information at a given frequency in the first image of FIG. 1A. For example, FFT module 254 may transform by a mathematical formula the image of FIG. 1A into spatial frequency components. To generate the frequency domain image, FFT module 254 may represent the image of FIG. 1A as a combination of sine and/or cosine like images. The result of the 2D-FFT may be a 3D plot of levels of intensity in the first image. Further details of the mathematical operation of FFT module 254 are described below with respect to FIGS. 5A and 5B. FFT module 254 may generate the frequency domain image indicate of frequency components as the second image, for further analysis by layering quantification module 250. The frequency domain image may represent a power spectrum. The spatial domain image if FIG. 1A may have standard Cartesian coordinates, and thus may have an X-axis and a Y-axis. The frequency domain image may have a u-axis and a v-axis, where the u-axis runs horizontally across the middle of the second image and the v-axis runs vertically through the middle of the image.

Layering quantification module 250 may execute intensity value parameter module 256 on the frequency domain image to generate one or more intensity value parameters (310). In some examples, intensity value parameter module 256 may generate a circle in the second image (e.g., as illustrated in FIG. 9B). The circle may have a center point at the intersection of the u-axis and v-axis of the frequency domain image. Intensity value parameter module 256 may generate an intensity value parameter by summing the luminance values of each pixel along a line segment from the center point to a circumference of the circle. Intensity value parameter module 256 may generate the circle at any suitable size. However, a circle which captures the majority of bright spots in the second image, surrounds the center of the 2D-FFT, and does not include edges of the frequency domain image may be preferable, because edge effects are reduced by windowing and the most or all of the information providing insight into any strong texture of directionally present in layer 10A may be captured within the circle.

In some examples, intensity value parameter module 256 determines a plurality of intensity value parameters. Each intensity value parameter may be generated by summing the luminance values of each pixel along each of a plurality of respective line segments from the center point of the circle to the circumference of the circle. For example, intensity value parameter module 256 may determine a first intensity value parameter by summing the luminance values of pixels along a line segment from the center point to a circumference of the circle that is parallel or nearly parallel (e.g., plus or minus 10 degrees) to a right edge of the image (e.g., collinear with the v-axis). Intensity value parameter module 256 may further determine a second intensity value parameter by summing the luminance values of a second line segment that extends from the center point to the circumference of the circle. The second line segment may be orthogonal to the first line segment. Third and fourth intensity value parameters may be similarly generated by summing the luminance values of pixels along respective third and fourth line segments. The third line segment may be parallel to the first line segment and the fourth line segment may be parallel to the second line segment.

After generating the intensity value parameters, layering quantification module 250 may execute chaos parameter module 258 to determine the quantification of layering of the microstructure of layer 10A. In some examples chaos parameter module may determine a chaos parameter as the quantification of layering of the microstructure of layer 10A. For example, chaos parameter module 258 may add the first intensity value parameter and the third intensity value parameter and divide by two to determine a numerator. Chaos parameter module 258 may further add the first intensity value parameter, second intensity value parameter, third intensity value parameter, and fourth intensity value parameter and dividing by two to determine a denominator. Chaos parameter module 258 may then determine the chaos parameter by dividing the numerator by the denominator.

Intensity value parameter module 256 and chaos parameter module 258 may determine intensity value parameters and/or chaos parameters in other ways. For example, rather than or in addition to forming four line segments that extend from the center point of the circle to the circumference, intensity value parameter module 256 may form a plurality of line segments, each line segment extending from the center point of the circle to the circumference of the circle. In some examples, intensity value parameter module 256 generates 360 line segments, with each line segment displaced from every other line segment by an angle of about one degree. Intensity value parameter module 256 may sum the luminance values along each of the plurality of line segments to determine a respective intensity value parameter. In this way, intensity value parameter 256 may radially sum the intensities across all angles in the frequency domain image, which may allow for discovery of any strong texture or directionally present in layer 10A.

In some examples, chaos parameter module 258 generates a chart of the plurality of intensity value parameters. In some examples, the chart may represent a spectral intensity distribution (312). The chart may include an axis for the intensity value parameters and an axis for the degree that each of the plurality of line segments is disposed at relative to the v-axis. Chaos parameter module 258 may determine a peak intensity value parameter of the plurality of intensity value parameters of the chart. That is, chaos parameter module may determine the radial angle of the circle where the sum of luminance values is greatest, indicating that the first image exhibits layering characteristics along the determined angle. Chaos parameter module 258 may then generate the chaos parameter by adding the peak intensity value parameter to an intensity value parameter of the plurality of intensity value parameters that is separated by 180 degrees from the peak intensity value parameter and dividing by two to determine a numerator, adding the peak intensity value parameter to three different intensity value parameters of the plurality of intensity value parameters and dividing by two to determine a denominator, where the three different intensity value parameters are separated from the peak intensity value parameters by 90 degrees, 90 degrees, and 180 degrees, respectively, and dividing the numerator by the denominator. In this way, imaging techniques according to the present disclosure may determine and quantify layering of the microstructure of layer 10A regardless of the angle of the layering in the image.

In some examples, intensity value parameter module 256 and chaos parameter module 258 perform a combination of the above-described techniques to generate the chaos parameter. For example, intensity value parameter module 256 may generate an intensity value parameter at each angle of the 360 degrees that are defined by the circle in the frequency domain image. Chaos parameter module 258 may find the intensity value parameters for a line segment formed at 0 degrees relative to the v-axis and a line segment formed at 180 degrees relative to the v-axis (e.g., along the v-axis in both directions from the center point of the circle to the circumference of the circle) (314). Chaos parameter module 258 may add the intensity value parameters for the line segments formed at 0 degrees and 180 degrees and divide by two to determine a numerator. Chaos parameter module 258 may determine a denominator by adding the intensity value parameters for line segments formed at 0 degrees, 90 degrees, 180 degrees, and 270 degrees relative to the v-axis, and dividing by two to determine the chaos parameter (316).

Example operations of intensity value parameter module 256 and chaos parameter module 258 will be further described below.

Figure 5A:
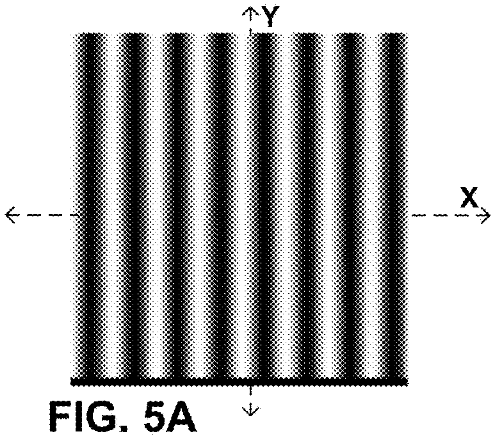
FIG. 5A is a conceptual image in a spatial domain.
Figure 5B:
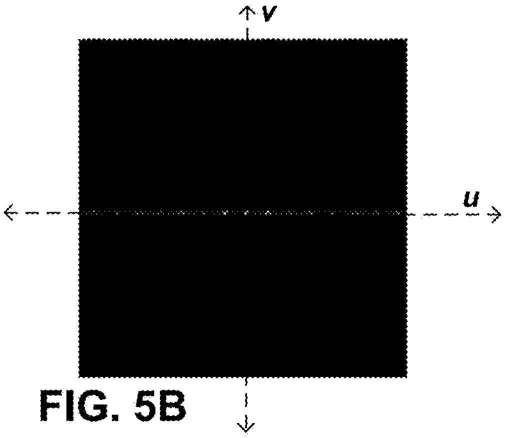
FIG. 5B illustrates a representation of the image of FIG. 5A transformed into the frequency domain, according to one or more examples of the current disclosure.

FIG. 5A is a conceptual image in a spatial domain. FIG. 5B illustrates a representation of the image of FIG. 5A transformed into the frequency domain, according to one or more examples of the current disclosure. FIGS. 6A-8B illustrate other example conceptual images, with the spatial domain image marked with an A and the frequency domain image marked B. Images marked with an A may be considered similar to the image representative of layer 10A of FIG. 1A. Although the images are conceptual and not representative of thermally-sprayed layers, the conceptual images illustrate the FFT transformation of an image from the spatial domain to the frequency domain. White areas in the image may have relatively high luminance values, and may be considered to correspond to areas of FIG. 1A indicative of phase particles 16A. Dark areas in the image may be considered indicative of pores 12A. The image or FIG. 5A illustrate an ordered arrangement of alternating layers of black and white arranged in vertical bars. Computing device 212 may perform an FFT on the image of FIG. 5A to generate the frequency domain image of FIG. 5B. The resulting image of FIG. 5B is only the magnitude, not the phase. The spatial domain image of FIG. 5A may have spatial Cartesian coordinates X and Y, while the frequency domain image of FIG. 5B may have a coordinate system with axes u and v.

FFT module 254 may determine a pattern in the distribution of phase particles of a layer by performing an FFT on the image. FFT module 254 may pick out repetitive elements in the original spatial domain image of FIG. 5A, such as the vertical stripes, and may manifest them in the frequency domain image of FIG. 5B. In some examples, FFT module 254 may perform a two-dimensional FFT to transform the image of FIG. 5A into the image of FIG. 5B. The spatial domain image of FIG. 5A may be made up of a matrix of pixels, with pixel in the matrix of pixels defining a luminance value. In some cases, the frequency domain image of FIG. 5B may be made up of a second matrix of pixels, with each pixel of the matrix of pixels also defining a luminance value.

In some examples, FFT module 254 performs the algorithm of EQUATION 1 to transform the image of FIG. 5A into the image of FIG. 5B:

$$F(u,v)=\int_{-\infty}^{\infty}\int_{-\infty}^{\infty} f(x,y)e^{(-i2\pi(ux+vy))}dxdy \quad \text{(Equation 1)}$$

where x and y are the spatial domain dimensions and u and v are the spatial frequencies. The solution to the two-dimensional FFT may be complex, as shown in EQUATION 2:

$$F(u,v)=F_R(u,v)+iF_I(u,v) \quad \text{(Equation 2)}$$

The subscripts R and I indicate the real and imaginary parts of the solution, respectively. The magnitude of each pixel may then be calculated, to give the power spectrum, by Equations 3 and 4. The power spectrum contains no phase information but provide the total amount of information at a given frequency. The power spectrum may be computed by EQUATIONS 3 and 4:

$$|F(u,v)|=(F_R(u,v))^2+F_I(u,v)^2)^{\frac{1}{2}} \quad \text{(Equation 3)}$$

$$F_{ln}(u,v)=\ln(+i|F(u,v)|) \quad \text{(Equation 4)}$$

The output may be translated to center (e.g., zero frequency component). In this way, the spatial domain image may be transformed into a frequency domain image, where the frequency domain image is made up of a matrix of pixels, with each pixel of the matrix of pixels in the second matrix of pixels indicative of a given frequency in the first image.

Figure 6A:
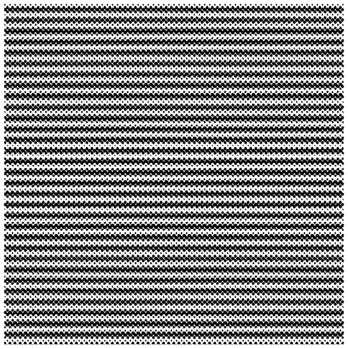
FIGS. 6A-8B illustrate other example conceptual images, similarly transformed into the frequency domain.
Figure 6B:
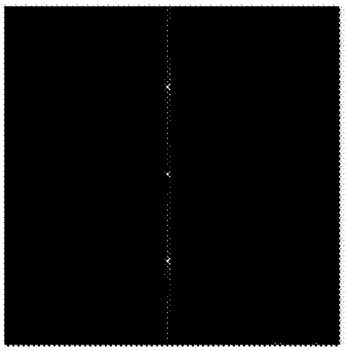
Figure 7A:
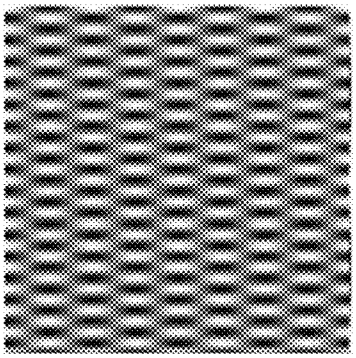
Figure 7B:
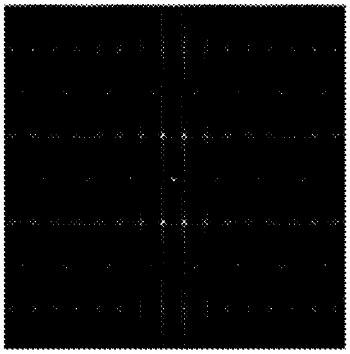
Figure 8A:
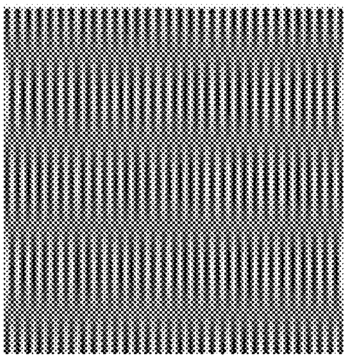
Figure 8B:
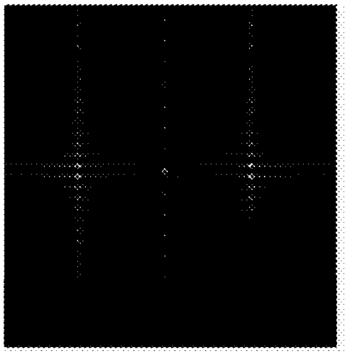

In some examples, FFT module 254 performs the FFT using commercially-available software. For example, FFT module 254 may include an instance of MATLAB® software, and FFT module 252 may perform the FFT using the MATLAB® function "FFT2," which returns the two-dimensional discrete Fourier transform of the image. The output of the MATLAB® function may be translated to center using the "fftshift" function, which may simplify visualization. As illustrated, high frequencies in the vertical direction (Y-direction) of the spatial domain image leads to bright dots forming away from the center in a vertical direction (u-direction) in the frequency domain image, as shown in FIGS. 6A and 6B, and vice versa. The bright dots in the frequency domain image may be indicative of a pixel or pixels with a relatively high luminance value, indicating that the spatial domain image has white or bright areas (e.g., corresponding to phase particles 16A) that appear with a certain frequency in that particular radial direction.

Since layer 10A may define ordered sub-layers that appear with unknown frequency, layering quantification module may employ intensity value parameter module 256, which may generate intensity value parameters which sum up the luminance values of each pixel that is part of a line segment that extends from the center point in the image to the circumference of the circle. The generated intensity value parameter may be indicative of any layering in the direction of the line segment, regardless of the frequency at which the layering is present.

Figure 9A:
FIG. 9A is a conceptual image in a spatial domain.
Figure 9B:
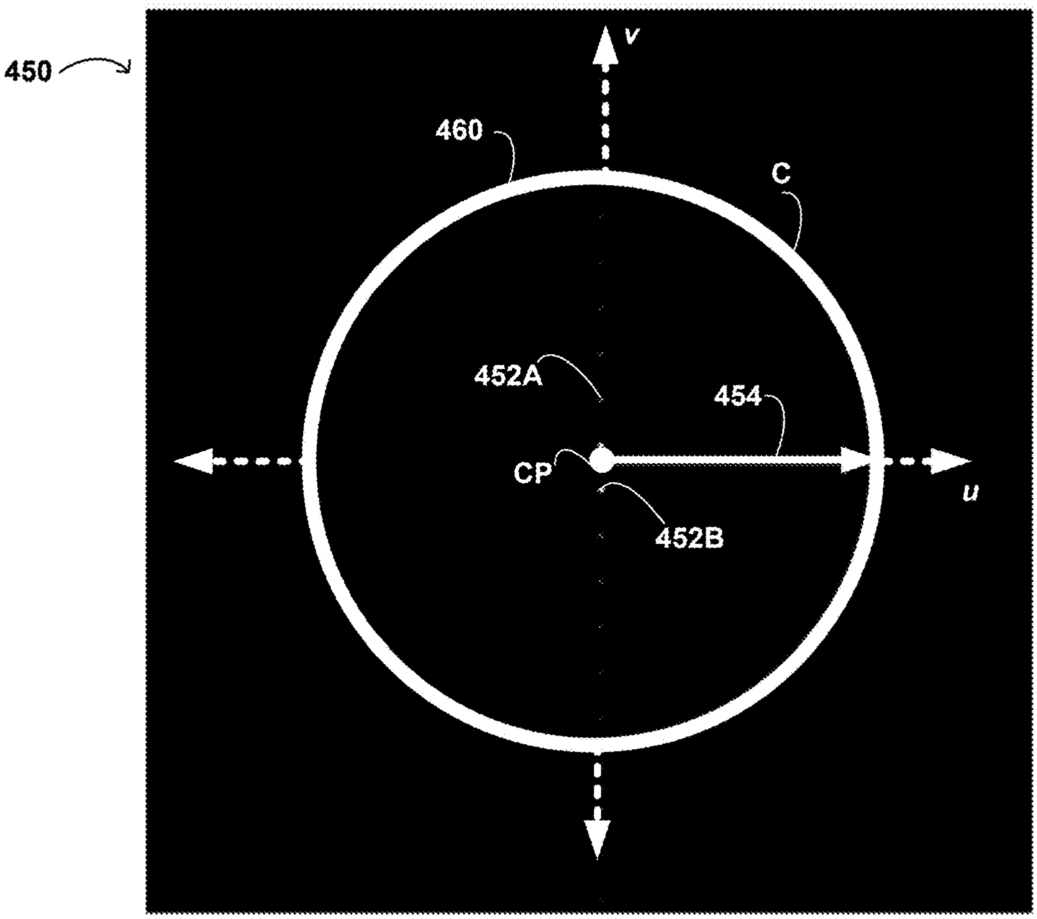
FIG. 9B illustrates a representation of the image of FIG. 9A in a frequency domain. The frequency domain image includes a circle formed in the frequency domain image by a computing device, in accordance with one or more examples of the present disclosure.
Figure 9C:
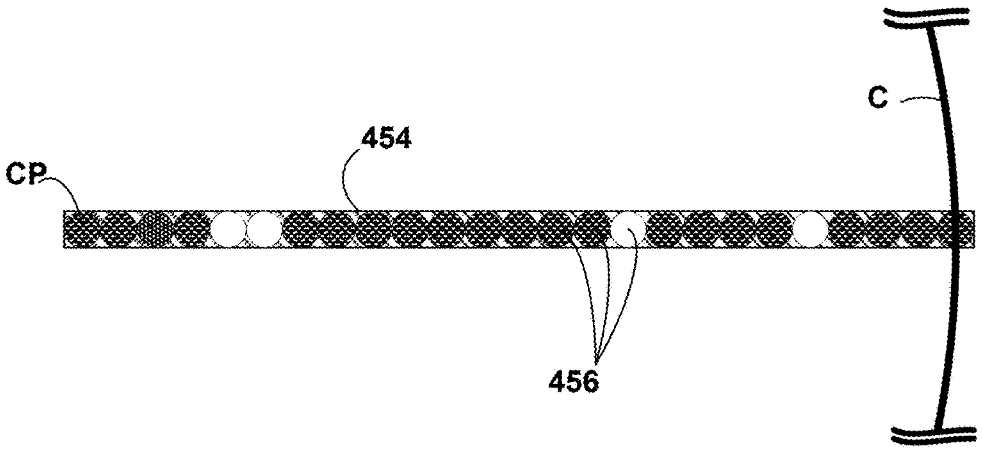
FIG. 9C illustrates a line segment according to the present disclosure.
Figure 9D:
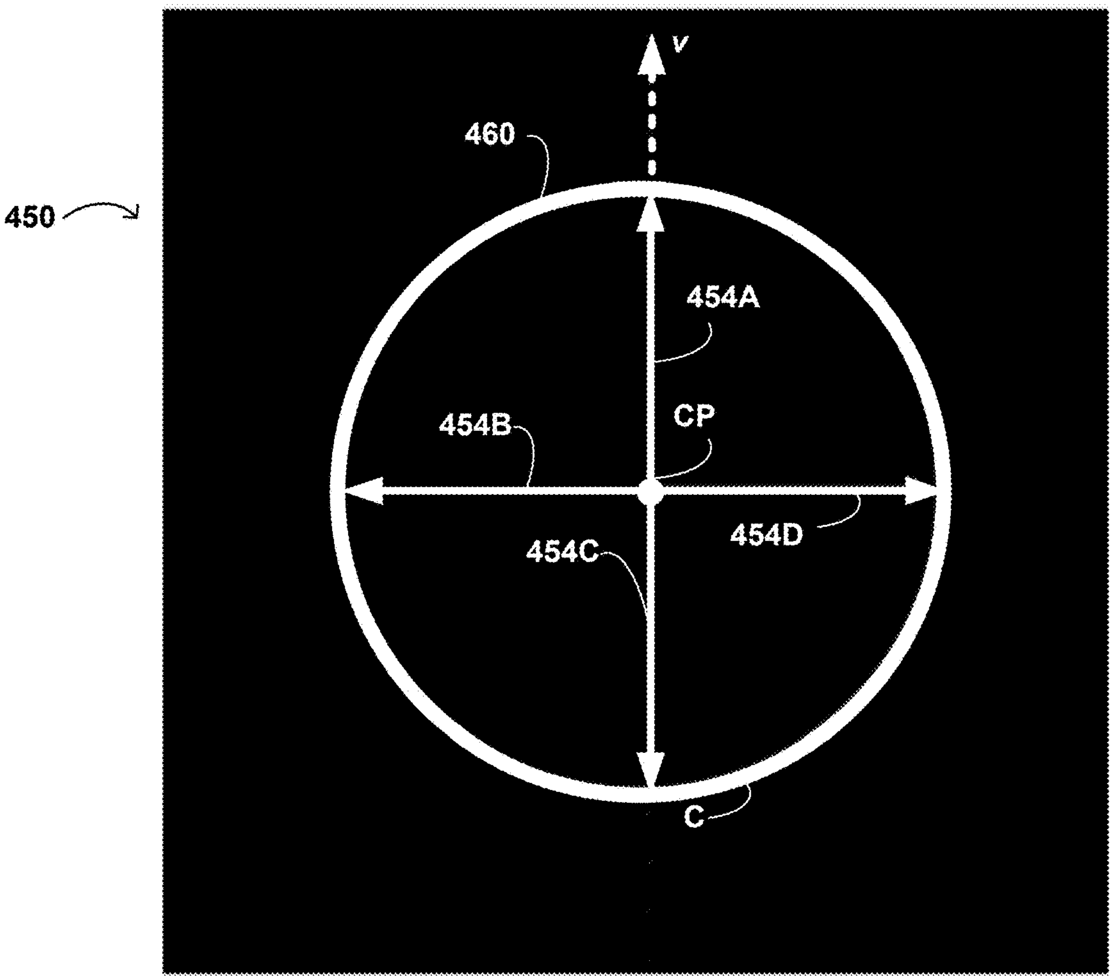
FIG. 9D illustrates an image analysis technique performed on the frequency domain image of FIG. 9B to quantify layering of the microstructure of the layer, in accordance with one or more examples of the present disclosure.

FIG. 9A is a conceptual image in a spatial domain. FIG. 9B illustrates a representation of the image of FIG. 9A in a frequency domain. The frequency domain image has a circle formed in the frequency domain image by a computing device, in accordance with one or more examples of the present disclosure. FIG. 9C illustrates a line segment according to the present disclosure. FIG. 9D illustrates an image analysis technique performed on the frequency domain image of FIG. 9B to quantify layering of the microstructure of the layer, in accordance with one or more examples of the present disclosure.

FIG. 9A is a conceptual image representative of a of a cross-section of layer 410. Layer 410 includes sub-layers 420. The arrangement of sub-layers 420 may be similar to the way phase particles 16B and pores 12B may align in ordered sub-layers layers in layer 10B of FIG. 1B if the thermal spray system is not properly operated. FFT module 254 may generate frequency domain image 450 of FIG. 9B as described above, based on luminance values of the pixels of FIG. 9A. Frequency domain image 450 may include bright spots 452A, 452B, which may be indicative of a presence of a given frequency in the image of FIG. 9A. Brighter bright spots 452A, 452B indicate a greater magnitude of the given frequency in FIG. 9A. The location of bright spots 452A, 452B within frequency domain image indicate directionality of repetitive elements (e.g., layering) in FIG. 9A. Since FIG. 9A illustrates layering in a horizontal direction, bright spots 452A, 452B form in vertical direction, along the v-axis. Since the image of FIG. 9A is uniform along any particular sub-layer of sub-layers 420, no bright spots 452A, 452B form in the horizontal direction, along the u-axis.

Intensity value parameter module 256 may generate circle 460 in the frequency domain image of FIG. 9B. Circle 460 may be generated at any suitable size. Forming circle 460 by intensity value parameter module 256 at a size which encompasses all or most of bright spots 452A, 452B, while at the same time not running into the edges of frequency domain image 450, may be advantageous, because all or most of the spatial frequencies of FIG. 9A may be captured and included in the calculation of the chaos parameter while simultaneously reducing edge effects by windowing. In some examples, the diameter of circle 460 may be in a range of from about 25 percent to about 90 percent of the width of image 450. Circle 460 may define center point CP at the intersection of the u-axis and the v-axis and a circumference C defining the edge of circle 460.

Intensity value parameter module 256 may generate line segment 454 in frequency domain image 450. Line segment 454 may extend from center point CP of circle 460 to circumference C of circle 460. Line segment 454 is illustrated in more detail in FIG. 9C. As illustrated in FIG. 9C, line segment 454 may be a single pixel wide across the length of line segment 454. Intensity value parameter module 256 may generate an intensity value parameter by summing the luminance values of each pixel 456 that is part of line segment 454. For example, line segment 454 may include 25 pixels 456, with 21 pixels having a luminance value of zero. Four pixels may be white pixels, each having a luminance value of 255. Thus, intensity value parameter module 456 may determine that the intensity value parameter for line segment 454 is 1,020.

With reference to FIG. 9D, in some examples, intensity value parameter module 256 generates line segments 454A, 454B, 454C, and 454D. Intensity value parameter module 256 sums the luminance values of pixels in each line segment to generate intensity value parameters. For example, line segment 454A may be formed parallel or nearly parallel (e.g., within 10 degrees) to the v-axis. In some examples, line segment 454A may be formed collinear with the v-axis. Intensity value parameter module 256 may form additional line segments 454B, 454C, and 454D. Line segment 454B and line segment 454A may be orthogonal. Line segment 454C may be parallel to line segment 454A, for example extending from center point CP to circumference C of circle 460 in an opposite direction from line segment 454A. Line segment 454D may, similarly, extend parallel to line segment 454B in an opposite direction from center point CP to circumference C of circle 460. Intensity value parameter module 256 may determine an intensity value parameter for each of line segments 454A, 454B, 454C, and 454D by summing the intensity value of the pixels included in the line segment.

Chaos parameter module 258 may determine a chaos parameter based on the determined intensity value parameters. For example, the intensity value parameter generated by summing the luminance values of pixels in line segment 454A may be termed intensity value A. Similarly, the intensity value parameter generated by summing the luminance values of pixels in line segment 454B may be termed intensity value B, the intensity value parameter generated by summing the luminance values of pixels in line segment 454A may be termed intensity value C, and the intensity value parameter generated by summing the luminance values of pixels in line segment 454D may be termed intensity value D. Chaos parameter module 258 may determine a numerator by adding A to B and dividing by two. Chaos parameter module 258 may determine a denominator by adding A, B, C, and D, then dividing by two. Chaos parameter module 258 may determine that the chaos parameter is equal to the numerator divided by the denominator. As such, the chaos parameter may be a number that ranges from zero to one as a quantification of layering of the microstructure of a thermally-sprayed layer. Since layer 410 of FIG. 9A has perfectly ordered sub-layers 420, the determined chaos parameter may be one. Since a thermal spray process may be built similar to sub-layers 420 (e.g., perpendicular to the spray direction), determining a chaos parameter in this way may be completed with limited computing power.

Figure 10:
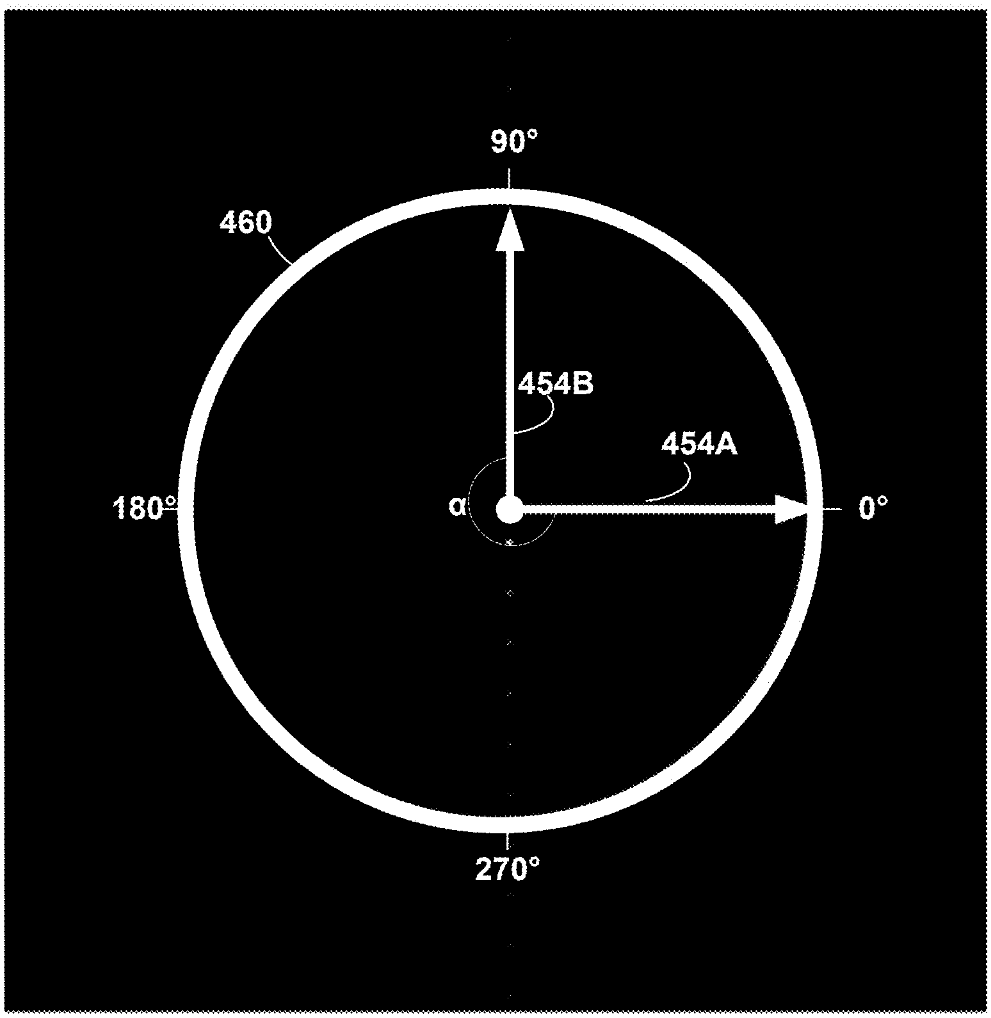
FIG. 10 illustrates another conceptual image representing an example image analysis technique performed on a frequency domain image to quantify layering of the microstructure of the layer.

In some examples, rather than determining a chaos parameter by forming four line segments and comparing them, as illustrated in FIG. 9D, layering quantification module 250 determines a chaos parameter by radially summing line segments formed at every radial angle around circle 460. In this way, layering may be captured and quantified regardless of the orientation of sub-layers 420. FIG. 10 illustrates another example image analysis technique performed on a frequency domain image to quantify layering of the microstructure of the layer. In FIG. 10, first line segment 454A is formed at 0 degrees, relative to the u-axis (not illustrated for clarity). Second line segment 454B is formed at 90 degrees relative to the u-axis, such that angle $\alpha$ is 90 degrees. Although not illustrated, intensity value parameter module may form a plurality of line segments, with a line segment formed at every integer angle with respect to the u-axis, such that a lines segment is formed with angle $\alpha$ equal to 1 degree, two degrees, three degrees, four degrees, and so on up to 359 degrees. Thus, in some examples, intensity value parameter module 256 may form 360 line segments, each line segment displaced from each other line segment by an angle of about one degree. Intensity value parameter module 256 may generate an intensity value parameter for each of the 360 line segments. Other spacing between line segments and other total numbers of line segments are also considered, for example line segments may be formed displaced from each other at about 10 degrees, or the like.

In these and other examples, chaos parameter module 258 may plot the intensity value parameters on a chart that includes an axis for the intensity value parameter and an axis for the degree at which they were formed relative to the u-axis. Chaos parameter module 258 may determine a peak intensity value parameter as the intensity value parameter of the 360 intensity value parameters with the greatest magnitude. Chaos parameter module 258 may determine a chaos parameter by first determining a numerator and a denominator. To determine the numerator, chaos parameter module 258 may add the peak intensity value parameter to an intensity value parameter of the plurality of intensity value parameters that is separated by 180 degrees from the peak intensity value parameter and dividing by two. To find the denominator, chaos parameter module 258 may add peak intensity value parameter to three different intensity value parameters of the plurality of intensity value parameters and dividing by two. The three different intensity value parameters may be separated from the peak intensity value parameters by 90 degrees, 90 degrees, and 180 degrees, respectively. Chaos parameter module 258 may determine the chaos parameter by dividing the numerator by the denominator. Alternatively, chaos parameter module 258 may determine the numerator as the peak intensity value parameter, and may determine the denominator as the peak intensity value parameter plus the intensity value parameter separated by 90 degrees from the peak intensity value parameter.

Figure 11A:
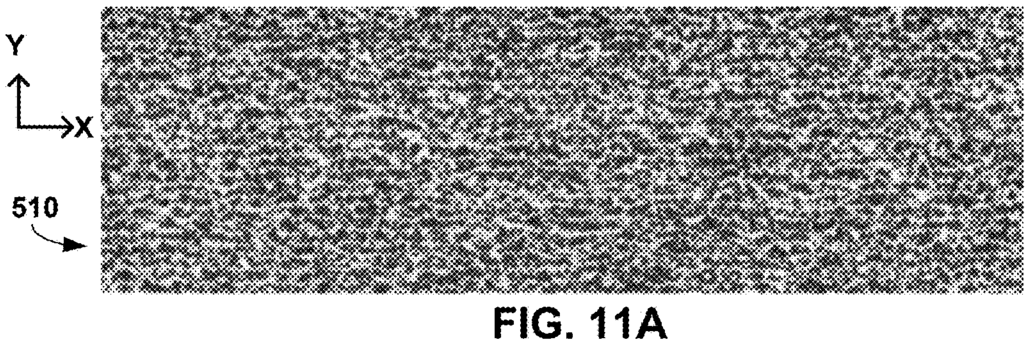
FIG. 11A illustrates a cross-section of an example layer having relatively high ordering.
Figure 11B:
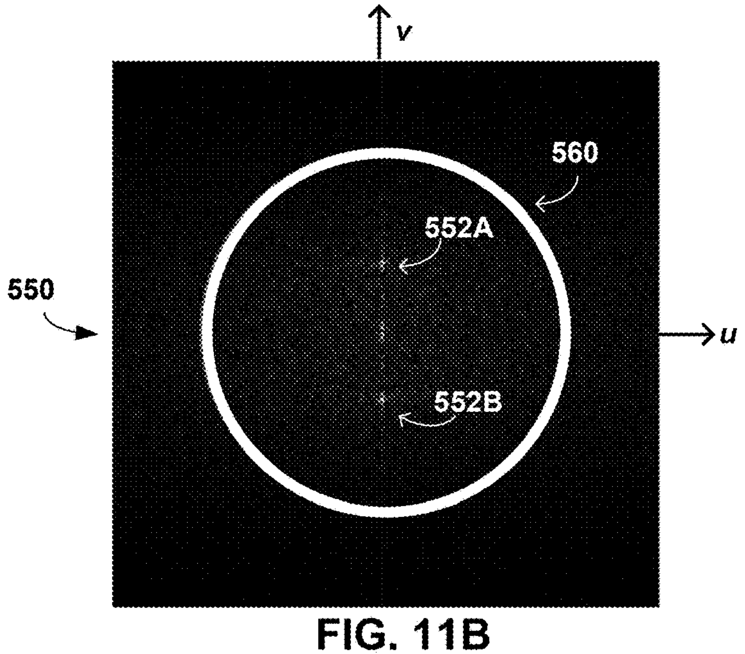
FIG. 11B illustrates the image of FIG. 11A transformed into a frequency domain image, with a circle formed in the frequency domain image.

FIG. 11A illustrates a cross-section of layer 510. Layer 510 may be an example of layer 10B of FIG. 1B, and may have a relatively ordered microstructure, where layering exists due to the alignment of phase particles within the microstructure. FIG. 11B illustrates the image of FIG. 11A transformed into frequency domain image 550, with circle 560 formed in frequency domain image 560. Bright spots 552A, 552B in frequency domain image 550 may form in a vertical direction along the v-axis, because layer 510 exhibits its layering in the x-direction in FIG. 11A.

Figure 11C:
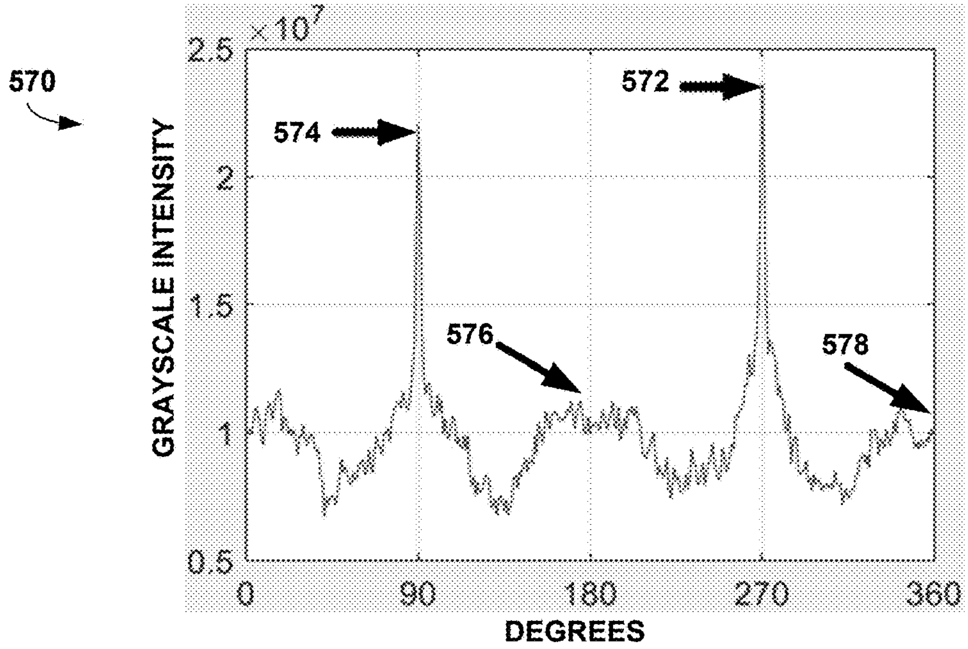
FIG. 11C is a chart illustrating a plurality of intensity value parameters generated from the image of FIG. 11B.

FIG. 11C is a chart illustrating a plurality of intensity value parameters generated from the image of FIG. 11B according to techniques described herein. Chart 570 of FIG. 11C includes an intensity value parameter determined by radially summing the luminance values of pixels in line segments disposed at each of 360 degrees around circle 560. The vertical axis of chart 570 illustrates the value of the determined intensity value parameter, while the horizontal axis illustrates the degree relative to the u-axis. As shown, the layered nature of layer 510 results in peak intensity value parameter 572 with relatively large magnitude when compared to intensity values 576, 578 separated by 90 degrees from peak intensity value 572. Chaos parameter module 258 may determine a chaos parameter by adding peak intensity value 572 and intensity value parameter 574, which is separated from peak intensity value parameter 572 by 180 degrees, and dividing by two to determine a numerator. Chaos parameter module 258 may determine adding intensity value parameters 572, 574, 576, and 578, and then dividing by two. Chaos parameter module 258 may determine a chaos parameter by diving the numerator by the denominator. Since intensity value parameters 572 and 574 are relatively larger than intensity value parameters 576 and 578, the determined chaos parameter may be relatively high (e.g., relatively close to 1, indicative of a relatively high degree of layering of layer 510).

Figure 12A:
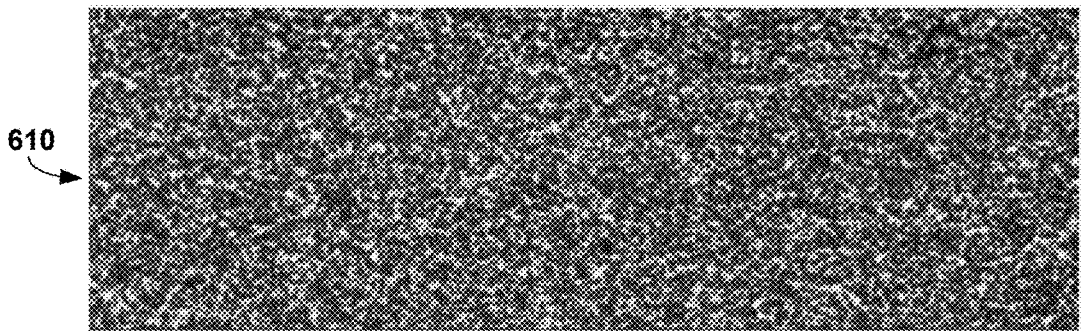
FIG. 12A illustrates a cross-section of an example layer having relatively low ordering.
Figure 12B:
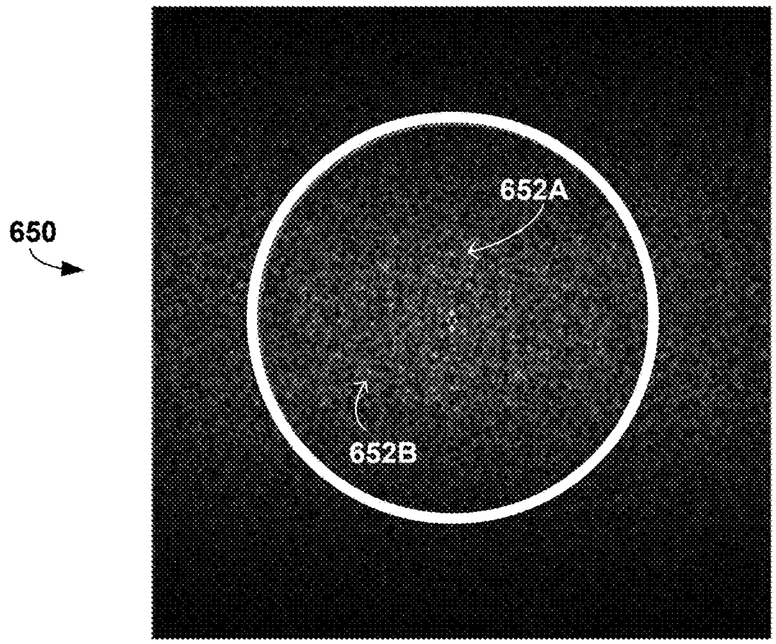
FIG. 12B illustrates the image of FIG. 12A transformed into a frequency domain image, with a circle formed in the frequency domain image.
Figure 12C:
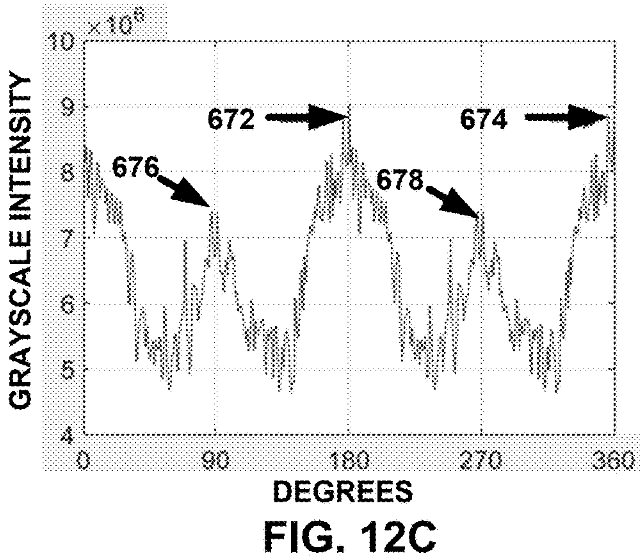
FIG. 12C is a chart illustrating a plurality of intensity value parameters generated from the image of FIG. 11B.

FIG. 12A illustrates a cross-section of layer 610. Layer 610 of FIG. 12A may be similar to layer 10A of FIG. 1A. As such, layer 610 has a relatively chaotic distribution of the microstructure, with limited alignments of phase particles and pores in sub-layers. FIG. 12B illustrates the image of FIG. 12A transformed into frequency domain image 650, with circle 660 formed in the frequency domain image. Bright spots 652A, 652B of frequency domain image 650 are chaotically distributed around the origin of the u-axis and v-axis. FIG. 12C is a chart illustrating a plurality of intensity value parameters generated from the image of FIG. 12B. Peak intensity value parameter 672 has less large a magnitude of difference than peak intensity value 572 of FIG. 11C. As such, chaos parameter module 258 may determine a chaos parameter that is lower (e.g., closer to zero) for layer 610 than for layer 510.

Figure 13:
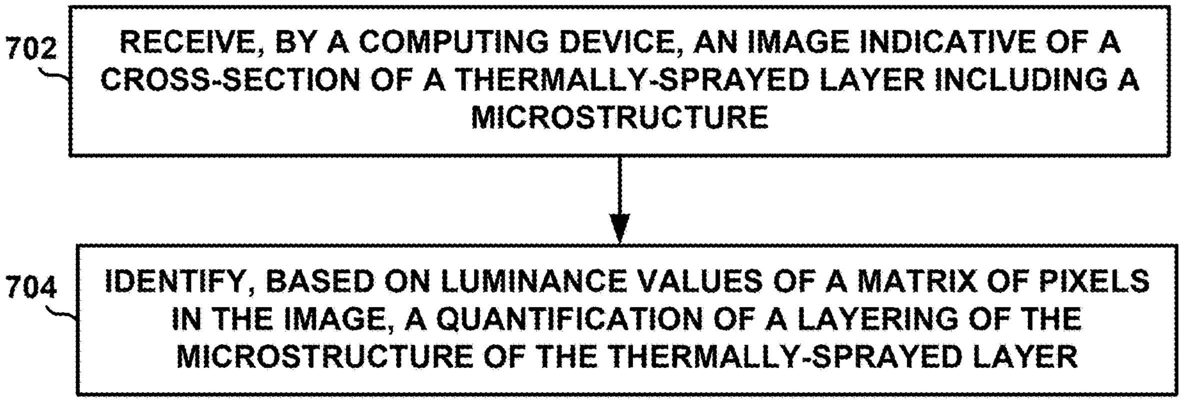
FIG. 13 is a flowchart illustrating an example method for determining a quantification of a layering of a microstructure of a thermally-sprayed layer, according to one or more examples of the present disclosure.
Figure 14A:
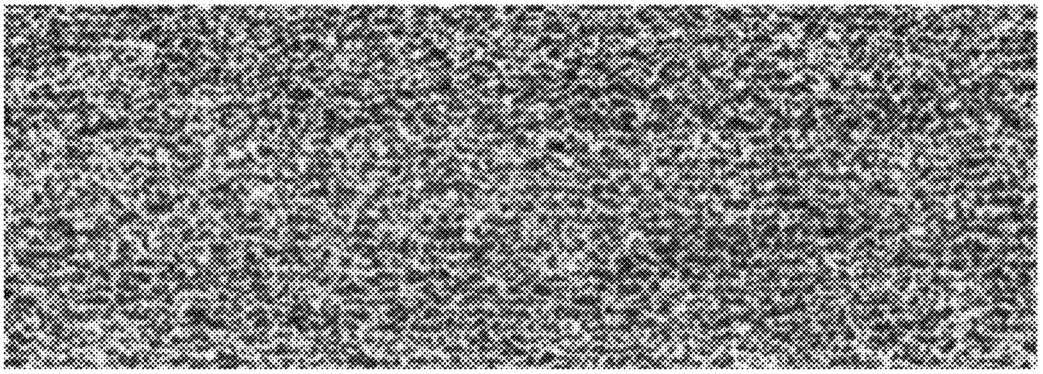
FIG. 14A illustrate a cross-section of an example thermally-sprayed layer having a first ordering.
Figure 14B:
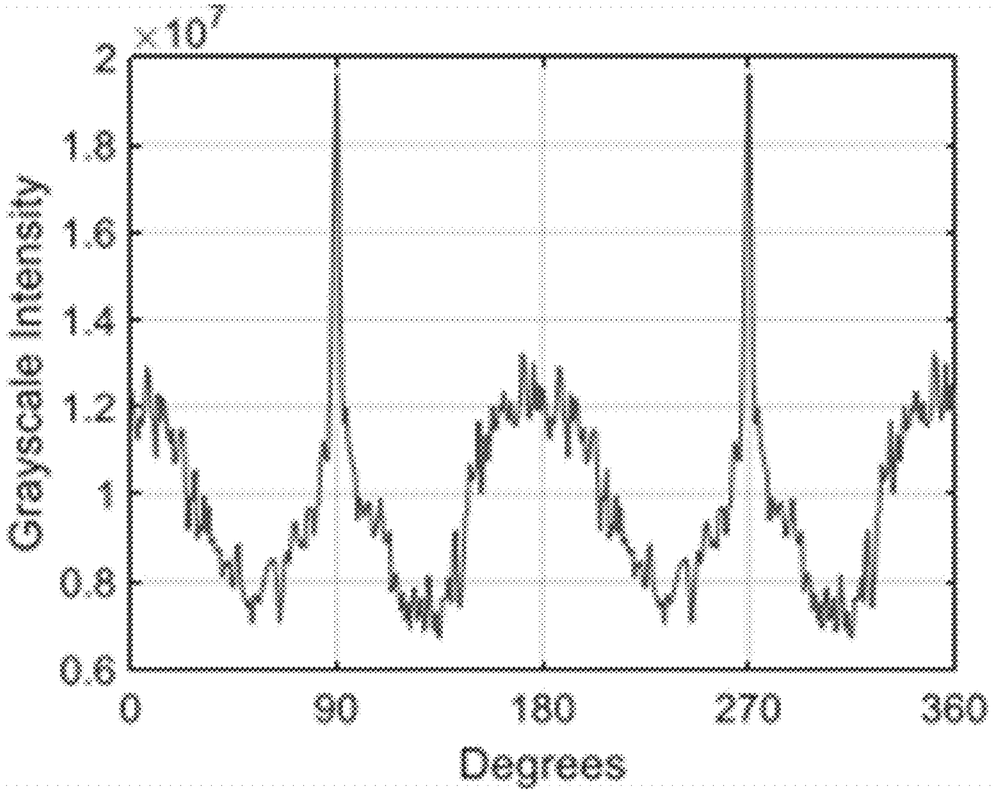
FIG. 14B is a chart illustrating a plurality of intensity value parameters generated from the image of FIG. 14A.
Figure 15A:
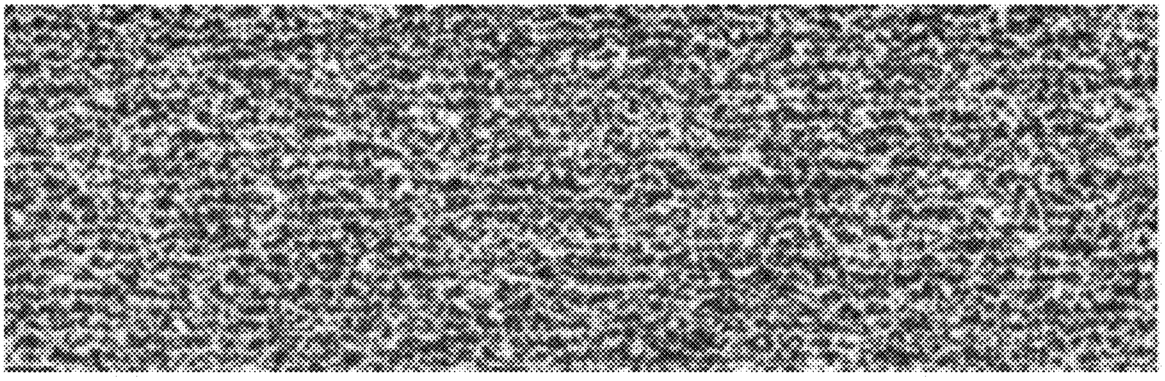
FIG. 15A illustrate a cross-section of an example thermally-sprayed layer having a second ordering.
Figure 15B:
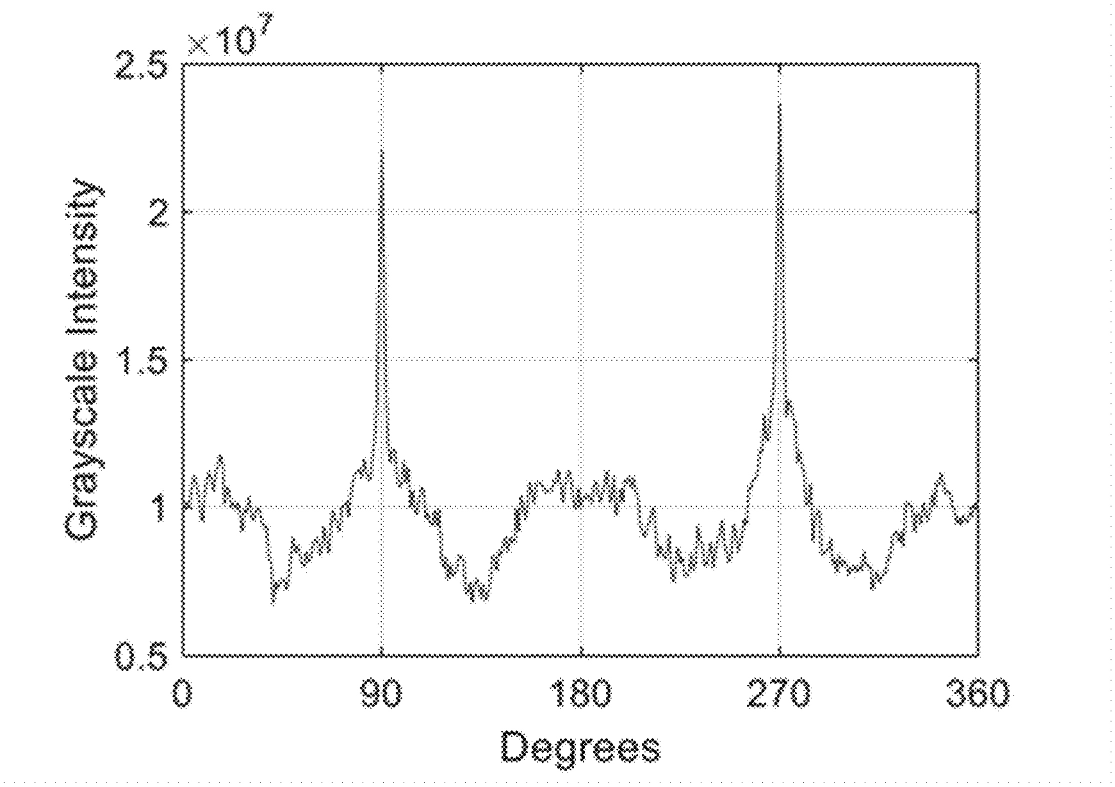
FIG. 15B is a chart illustrating a plurality of intensity value parameters generated from the image of FIG. 15A.
Figure 16A:
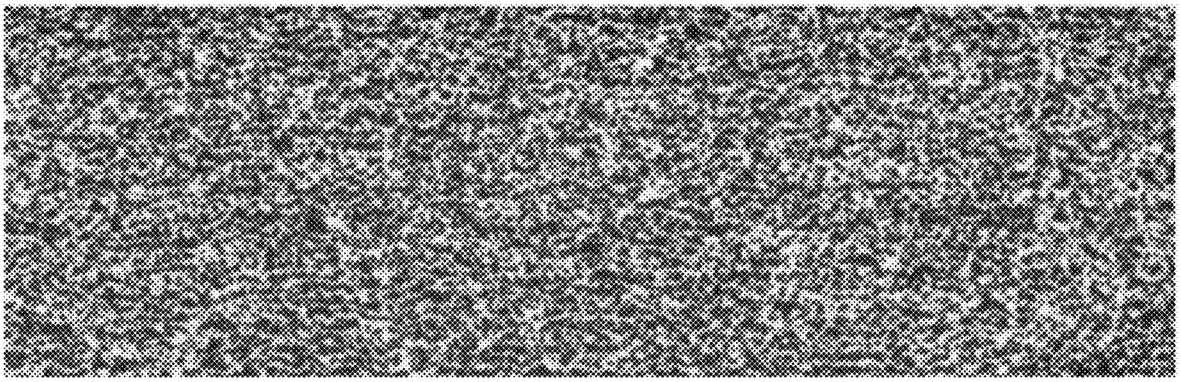
FIG. 16A illustrate a cross-section of an example thermally-sprayed layer having a third ordering.
Figure 16B:
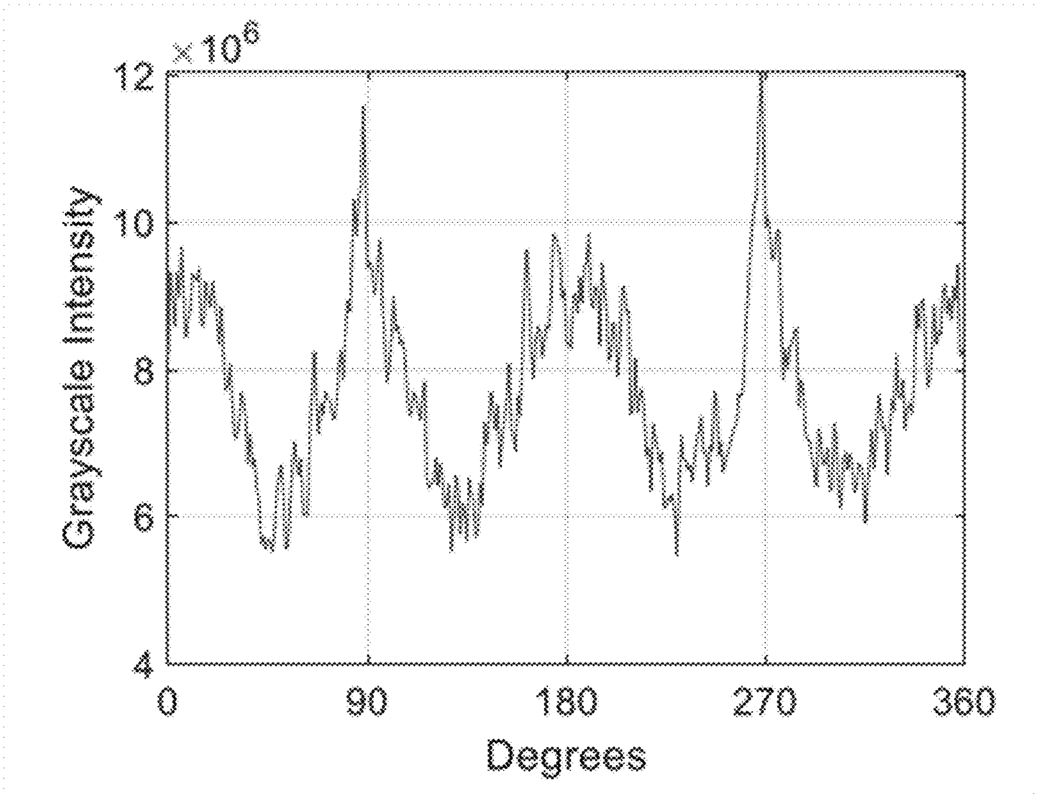
FIG. 16B is a chart illustrating a plurality of intensity value parameters generated from the image of FIG. 16A.
Figure 17A:
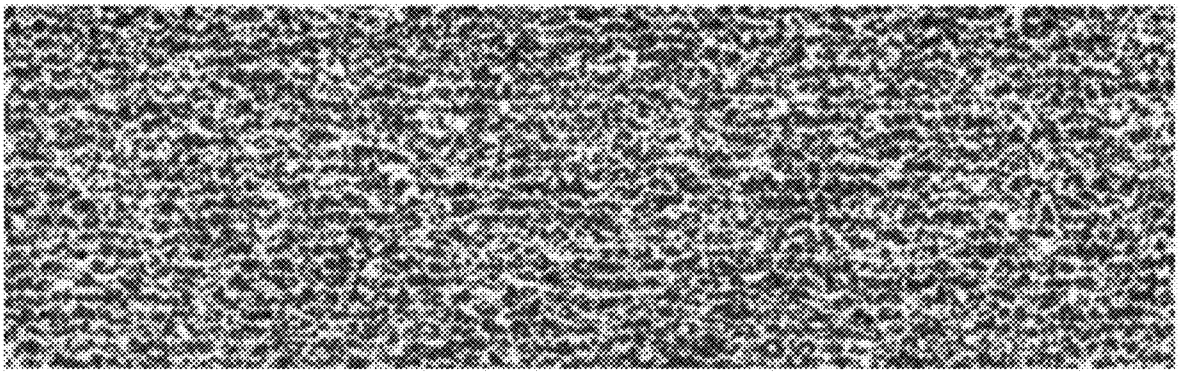
FIG. 17A illustrate a cross-section of an example thermally-sprayed layer having a fourth ordering.
Figure 17B:
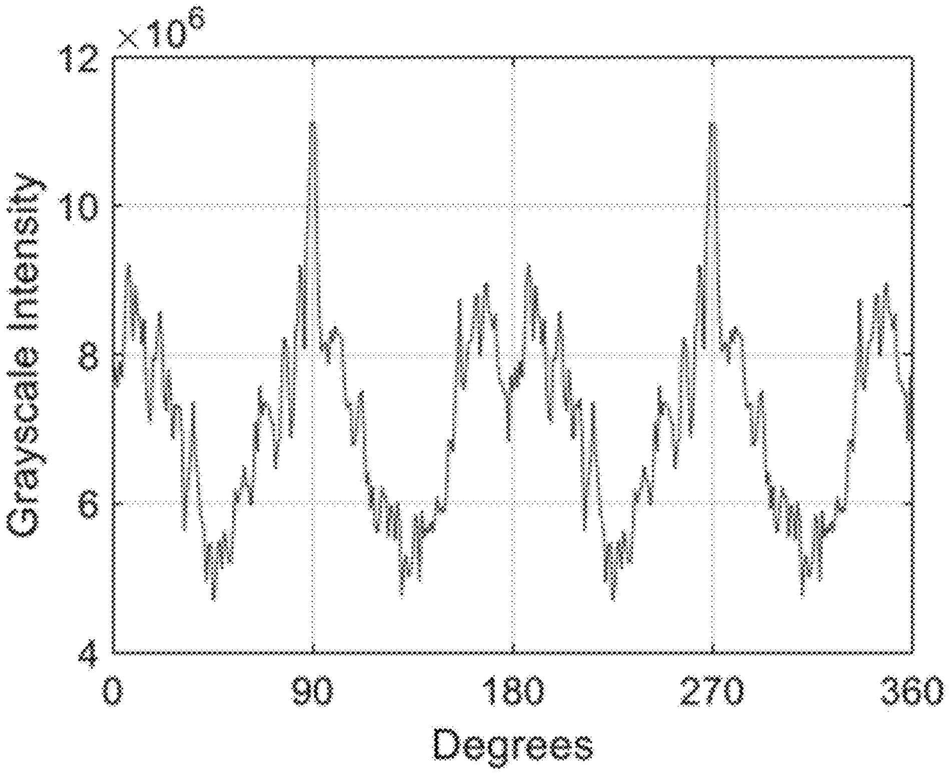
FIG. 17B is a chart illustrating a plurality of intensity value parameters generated from the image of FIG. 17A.
Figure 18A:
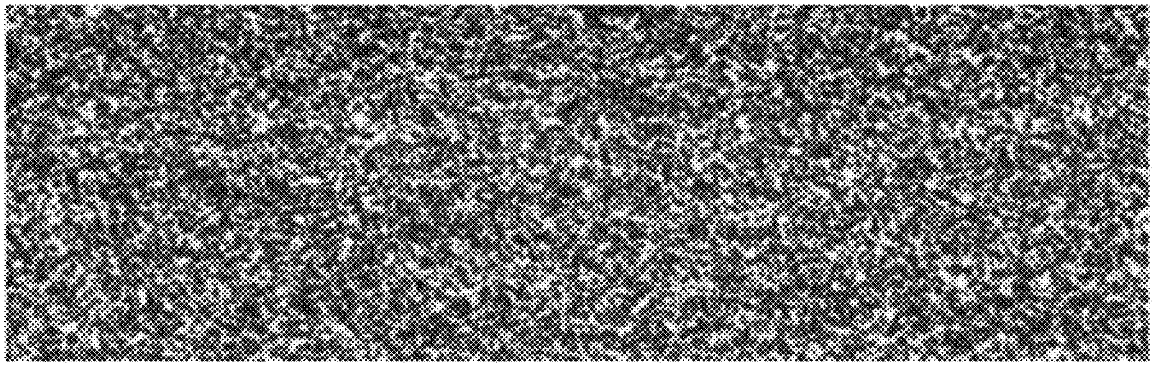
FIG. 18A illustrate a cross-section of an example thermally-sprayed layer having a fifth ordering.
Figure 18B:
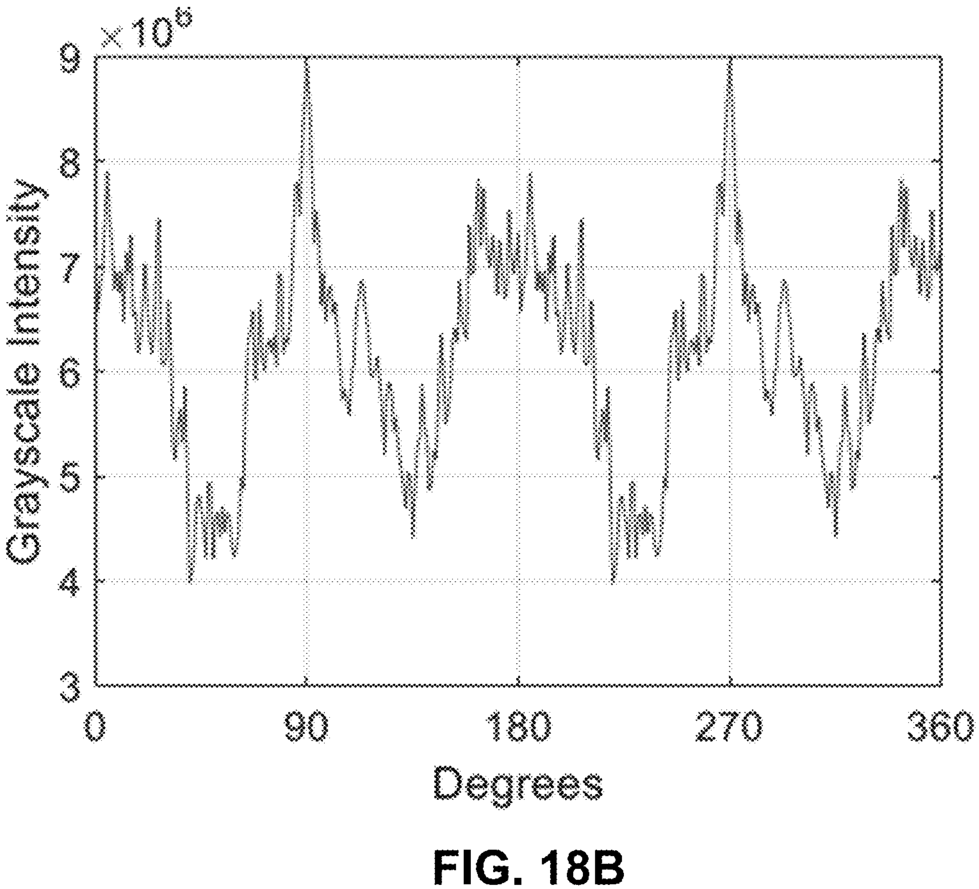
FIG. 18B is a chart illustrating a plurality of intensity value parameters generated from the image of FIG. 18A.
Figure 19A:
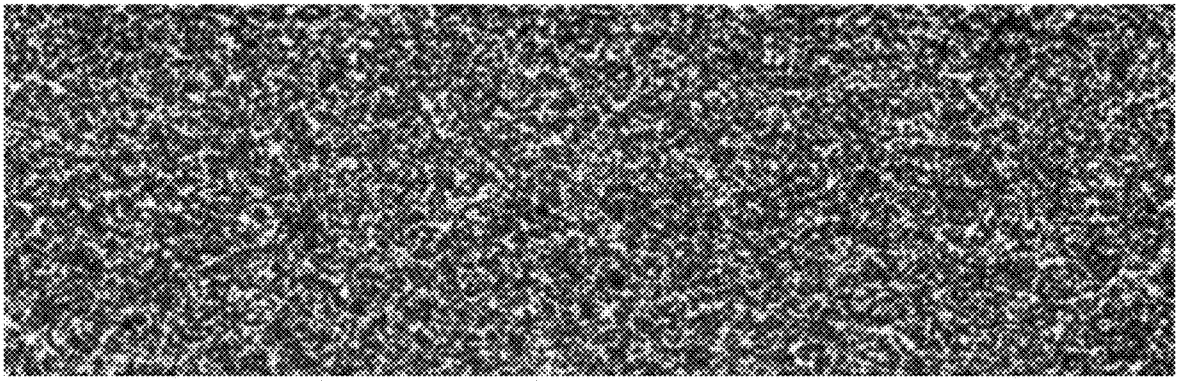
FIG. 19A illustrate a cross-section of an example thermally-sprayed layer having a sixth ordering.
Figure 19B:
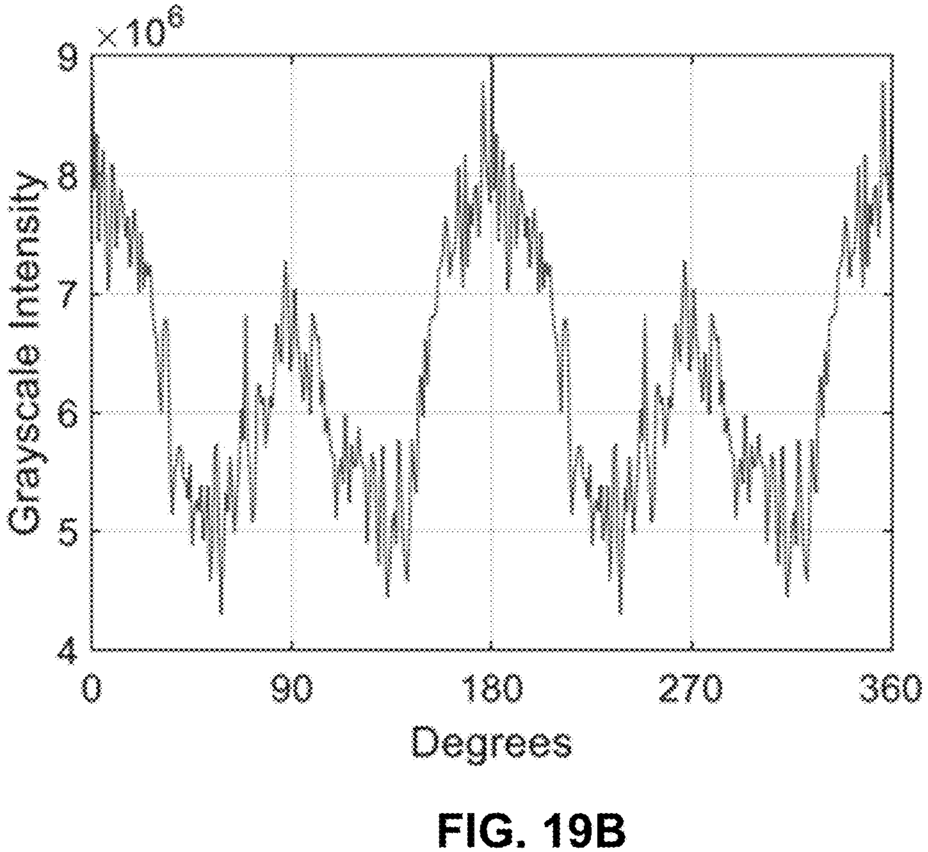
FIG. 19B is a chart illustrating a plurality of intensity value parameters generated from the image of FIG. 19A.
Figure 20A:
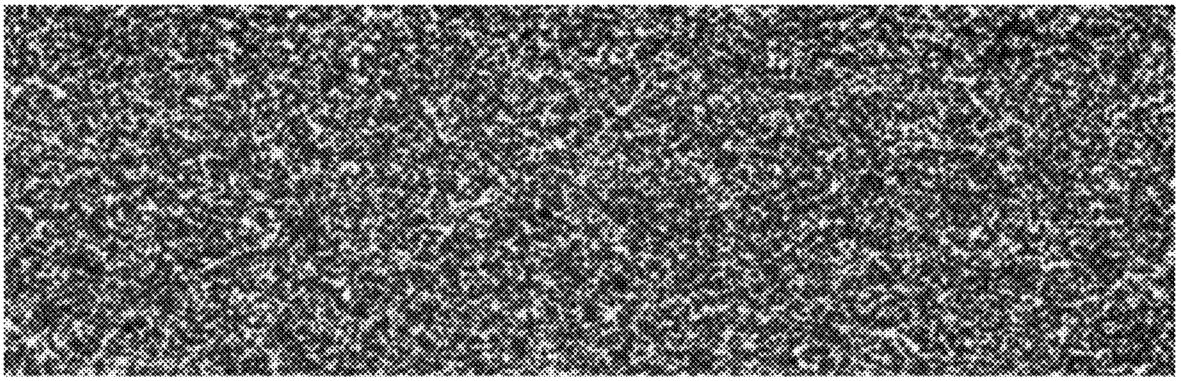
FIG. 20A illustrate a cross-section of an example thermally-sprayed layer having a relatively low ordering.
Figure 20B:
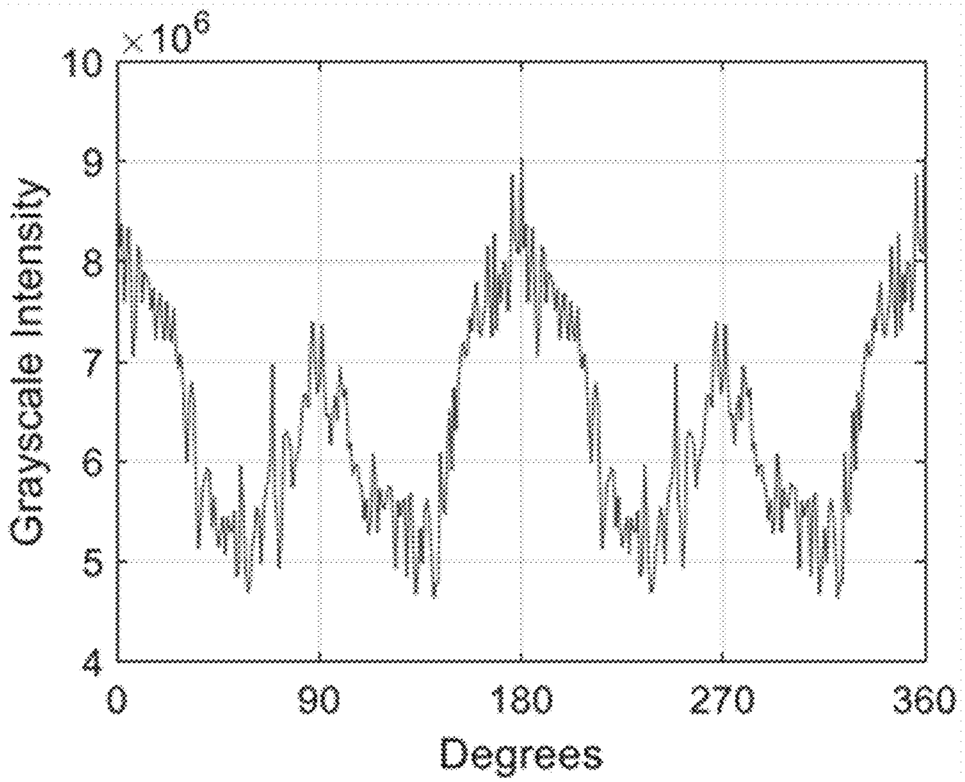
FIG. 20B is a chart illustrating a plurality of intensity value parameters generated from the image of FIG. 20A.

FIG. 13 is a flowchart illustrating an example method for determining a quantification of a layering of a microstructure of a thermally-sprayed layer, according to one or more examples of the present disclosure. FIG. 13 is a flowchart illustrating an example method for determining a quantification of layering of the microstructure of a thermally-sprayed layer, according to one or more examples of the present disclosure. The technique of FIG. 13 will be described with reference to layer 10A of FIG. 1A, thermal spray system 100 of FIG. 2, and computing device 212 of FIG. 3, although the layer 10A may deposited by another system using another technique. Furthermore, the described technique may be used to deposit other layers, and may be performed using other systems.

Computing device 212 may receive an image indicative of a cross-section of layer 10A (702). In some examples, the image indicative of a cross-section of layer 10A (e.g., FIG. 1A) may be received by computing device 212, and the image may include a matrix of individual pixels. The image may be captured by imaging device 140. The image may be a micrograph, and may be in black and white or in color. Each pixel in the matrix of pixels may define a luminance value. The luminance value may be the brightness intensity. In some examples, the brightness intensity may range from a luminance value of zero to indicate a black color to a luminance value of, for example, 255 to indicate a white color. Other scales of luminance values are also considered. Further, other examples are also considered, such as where the maximum luminance value is indicative of a black color and the minimum luminance value is indicative of a white color. In examples where the image is a color image, each pixel in the matrix of pixels may include a luminance value for each of a red color, a yellow color, and a blue color. In some examples, the technique may include determining an overall luminance value by, for example, summing or averaging the luminance values for each of the red color, the yellow color, and the blue color. The technique may then proceed based on the determined overall luminance value.

Chaos parameter module 258 may determine, based on luminance values of the matrix of pixels in the image, a quantification of a layering of the microstructure of layer 10A (704). Chaos parameter module may determine the quantification of layering of the microstructure of layer 10A as a chaos parameter. The chaos parameter may be based on one or more intensity value parameters generated by intensity value parameter module 256. Intensity value parameter module 256 may generate one or more intensity value parameters by analyzing a frequency domain image. The frequency domain image may be generated by FFT module 254, using the spatial domain image of FIG. 1A as an input.

Optionally, in some examples, normalizing module 252 normalizes the raw image to generate a grayscale image. The grayscale image may have reduced or eliminated brightness gradients that may result from the way the raw image is captured or other artificial means. For example, a flash associated with imaging device 140 may cause a central portion of the raw image to appear brighter than the perimeter of the image, and executing normalization module 252 may correct for the camera flash. In some examples, normalization module 252 may adjust a luminance value of at least one pixel of the matrix of pixels. For example, adjusting the luminance value of at least one pixel may include determining a background luminance value for each individual pixel in the matrix of pixels, and subtracting the background luminance value from each individual pixel luminance value. The resulting normalized image may be a grayscale image, which may result in a more accurate representation of layer 10A.

EXAMPLES

A series of seven different thermally-sprayed layers were deposited and imaged as described herein. To deposit the seven different layers, various parameters of the thermal spray process were varied. For example, the current supplied to the thermal spray gun (e.g., thermal spray gun 120) was varied between 363 Amps and 456 Amps. The voltage was varied between 70 volts and 95 volts. The primary carrier gas flow was varied between 70 normal liters per minute (NLPM) and 150 NLPM. The powder feed rate to the thermal spray gun was varied in a range from 33.5 grams/minute per injector and 55 grams/minute per injector. FIGS. 14A, 15A, 16A, 17A, 18A, 19A, and 20A illustrate the captured cross-sectional images of example layers 1-7, respectively. FIGS. 14B, 15B, 16B, 17B, 18B, 19B, and 20B illustrate the captured cross-sectional images of example layers 1-7, respectively.

A computing device analyzed the images of the example layers according to techniques described herein to determine a chaos parameter for each layer. Example Layer 1 of FIG. 14A was determined to have a chaos parameter of 0.5974. Example Layer 2 of FIG. 15A was determined to have a chaos parameter of 0.6988. Example Layer 3 of FIG. 16A was determined to have a chaos parameter of 0.5163. Example Layer 4 of FIG. 17A was determined to have a chaos parameter of 0.5470. Examples Layer 5 of FIG. 18A was determined to have a chaos parameter of 0.5302. Example Layer 6 of FIG. of FIG. 19A was determined to have a chaos parameter of 0.4393. Example layer 7 of FIG. 20A was determined to have a chaos parameter of 0.4502. The examples demonstrate that aspects of the present disclosure may be used to determine a chaos parameter as a quantification of layering of the microstructure of a thermally-sprayed layer. The chaos parameter may be correlated with certain settings of a thermal spray process, and may be used to control a thermal spray process to deposit a thermally-sprayed layer.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following examples and claims.

Example 1: A method includes receiving, by a computing device, an image indicative of a cross-section of a thermally-sprayed layer, the thermally-sprayed layer comprising a microstructure, wherein the image comprises a matrix of pixels, each pixel in the matrix of pixels defining a respective luminance value; determining, by the computing device and based on the luminance values of the matrix of pixels, a quantification of a layering of the microstructure of the thermally-sprayed layer.

Example 2: The method of example 1, wherein the microstructure of the thermally-sprayed comprises a plurality of phase particles, wherein the layering is indicative of alignment of the plurality of phase particles with each other in layers, and wherein the method further comprises: determining, by the computing device, a pattern in a distribution of the plurality of phase particles to determine the quantification of the layering of the microstructure of the thermally-sprayed layer.

Example 3: The method of example 2, wherein determining the pattern in the distribution of the plurality of phase particles comprises performing, by the computing device, a Fast Fourier Transform (FFT) on the image.

Example 4: The method of example 3, wherein the image is a first image indicative of a spatial domain, wherein the luminance values of each pixel in the matrix of pixels in the first image is indicative of a spatial position of at least one phase particle of the plurality of phase particles in the thermally-sprayed layer, and wherein the method further comprises generating, by the computing device and based on the first image, a second image, wherein the second image is indicative of a frequency domain.

Example 5: The method of example 4, wherein the matrix of pixels is a first matrix of pixels, wherein the second image comprises a second matrix of pixels, the second matrix equal in size to the first matrix of pixels, and wherein each pixel in the second matrix of pixels defines a respective luminance value indicative of a given frequency in the first image.

Example 6: The method of example 5, wherein the second matrix of pixels is equal in size to the first matrix of pixels.

Example 7: The method of any of examples 4 through 6, further includes generating, by the computing device, a circle in the second image, wherein the circle has a center point at the intersection of a u-axis and a v-axis of the second image, and generating, by the computing device, an intensity value parameter by summing the luminance values of each pixel along a line segment from the center point to a circumference of the circle.

Example 8: The method of example 7, wherein the intensity value parameter is a first intensity value parameter, wherein the line segment is a first line segment, wherein the first line segment is disposed at a first angle relative to a v-axis of the second image, and wherein the method further comprises, by the computing device, generating a second intensity value parameter by summing, by the computing device, the luminance values of each pixel along a second line segment from the center point to an edge of the circle, wherein the first line segment and the second line segment are orthogonal.

Example 9: The method of example 8, wherein the first angle is parallel or nearly parallel to the v-axis of the second image.

Example 10: The method of any of examples 8 and 9, further comprising generating, by the computing device, a third intensity value parameter by summing the luminance values of each pixel along a third line segment from the center point to the circumference of the circle, and generating, by the computing device, a fourth intensity value parameter by summing the luminance values of each pixel along a fourth line segment from the center point to the circumference of the circle, wherein the third line segment is parallel to the first line segment and the fourth line segment is parallel to the second line segment.

Example 11: The method of example 10, further includes adding the first intensity value parameter and the third intensity value parameter and dividing by two to determine a numerator, adding the first intensity value parameter, second intensity value parameter, third intensity value parameter, and fourth intensity value parameter and dividing by two to determine a denominator, and determining the chaos parameter by dividing the numerator by the denominator.

Example 12: The method of any of examples 7 through 11, further comprising generating, by the computing device, a plurality of intensity value parameters comprising the intensity value parameter by summing the luminance values of each pixel along each respective line segment of a plurality of line segments, each line segment of the plurality of line segments intersecting the center point of the circle and the circumference of the circle.

Example 13: The method of example 12, wherein the plurality of line segments consists of 360 line segments, each line segment displaced from every other line segment by an angle of about one degree.

Example 14: The method of example 13, further comprising generating, by the computing device, a chart of the plurality of intensity value parameters, wherein the chart includes an axis for the intensity value parameters and an axis for the degree of the plurality of line segments relative to the u-axis, determining, by the computing device, a peak intensity value parameter of the plurality of intensity value parameters of the chart, generating, by the computing device, and based at least partially on the determined peak intensity value parameter, a chaos parameter as a number indicative of layering of the porosity of the thermally-sprayed layer.

Example 15: The method of example 14, wherein generating the chaos parameter comprises: adding, by the computing device, the peak intensity value parameter to an intensity value parameter of the plurality of intensity value parameters that is separated by 180 degrees from the peak intensity value parameter and dividing by two to determine a numerator, adding, by the computing device, the peak intensity value parameter to three different intensity value parameters of the plurality of intensity value parameters and dividing by two to determine a denominator, wherein the three different intensity value parameters are separated from the peak intensity value parameters by 90 degrees, 90 degrees, and 180 degrees, respectively, and determining, by the computing device, the chaos parameter by dividing the numerator by the denominator.

Example 16: The method of any of examples 11 through 15, further includes comparing, by the computing device, the determined chaos parameter to a threshold chaos parameter, and responsive to determining that the determined chaos parameter exceeds the threshold chaos parameter, controlling, by the computing device, at least one parameter of a thermal spray gun configured to apply the thermally-sprayed coating.

Example 17: The method of any of examples 1 through 16, further comprising normalizing, by the computing device, the image by adjusting a luminance value of at least one pixel of the matrix of pixels.

Example 18: The method of example 17, wherein normalizing, by the computing device, the image comprises correcting for non-uniform illumination of the cross-section of the thermally-sprayed layer by reducing or eliminating brightness gradients within the image.

Example 19: A non-transitory computer-readable storage medium having stored thereon instructions that, when executed, configure a processor to: receive an image indicative of a cross-section of a thermally-sprayed layer, the thermally-sprayed layer comprising a microstructure, wherein the image comprises a matrix of pixels, each pixel in the matrix of pixels defining a respective luminance value; determine, based on the luminance values of the matrix of pixels, a quantification of a layering of the microstructure of the thermally-sprayed layer.

Example 20: A system includes a thermal spray gun configured to apply a thermally-sprayed layer to a substrate; an imaging device configured to capture an image indicative of a cross-section of the thermally-sprayed layer, the thermally-sprayed layer includes receive an image indicative of a cross-section of the thermally-sprayed layer; and determine, based on the luminance values of the matrix of pixels, a quantification of a layering of the microstructure of the thermally-sprayed layer.

What is claimed is:

1. A method comprising:

receiving, by a computing device, an image indicative of a cross-section of a thermally-sprayed layer, the thermally-sprayed layer comprising a microstructure, the microstructure including a plurality of phase particles, wherein the image comprises a matrix of pixels, each pixel in the matrix of pixels defining a respective luminance value; and determining, by the computing device and based on the luminance values of the matrix of pixels, a quantification of a layering of the microstructure of the thermally-sprayed layer, wherein the layering is indicative of alignment of the plurality of phase particles with each other in layers, wherein determining the quantification of layering comprises determining, by the computing device, a pattern in a distribution of the plurality of phase particles to determine the quantification of the layering of the microstructure of the thermally-sprayed layer.

2. The method of claim 1, wherein determining the pattern in the distribution of the plurality of phase particles comprises performing, by the computing device, a Fast Fourier Transform (FFT) on the image.

3. The method of claim 2, wherein the image is a first image indicative of a spatial domain, wherein the luminance values of each pixel in the matrix of pixels in the first image is indicative of a spatial position of at least one phase particle of the plurality of phase particles in the thermally-sprayed layer, and wherein the method further comprises generating, by the computing device and based on the first image, a second image, wherein the second image is indicative of a frequency domain.

4. The method of claim 2, wherein the matrix of pixels is a first matrix of pixels, wherein the second image comprises a second matrix of pixels, the second matrix of pixels equal in size to the first matrix of pixels, and wherein each pixel in the second matrix of pixels defines a respective luminance value indicative of a given frequency in the first image.

5. The method of claim 2, further comprising:

generating, by the computing device, a circle in the second image, wherein the circle has a center point at an intersection of a u-axis and a v-axis of the second image, and generating, by the computing device, an intensity value parameter by summing the luminance values of each pixel along a line segment from the center point to a circumference of the circle.

6. The method of claim 5, wherein the intensity value parameter is a first intensity value parameter, wherein the line segment is a first line segment, wherein the first line segment is disposed at a first angle relative to the v-axis of the second image, and wherein the method further comprises, by the computing device, generating a second intensity value parameter by summing, by the computing device, the luminance values of each pixel along a second line segment from the center point to an edge of the circle, wherein the first line segment and the second line segment are orthogonal.

7. The method of claim 6, wherein the first line segment is parallel or nearly parallel to the v-axis of the second image.

8. The method of claim 6, further comprising generating, by the computing device, a third intensity value parameter by summing the luminance values of each pixel along a third line segment from the center point to the circumference of the circle, and generating, by the computing device, a fourth intensity value parameter by summing the luminance values of each pixel along a fourth line segment from the center point to the circumference of the circle, wherein the third line segment is parallel to the first line segment and the fourth line segment is parallel to the second line segment.

9. The method of claim 8, further comprising generating, by the computing device, a chaos parameter as a number indicative of layering of a porosity of the thermally-sprayed layer by:

adding the first intensity value parameter and the third intensity value parameter and dividing by two to determine a numerator, adding the first intensity value parameter, second intensity value parameter, third intensity value parameter, and fourth intensity value parameter and dividing by two to determine a denominator, and determining the chaos parameter by dividing the numerator by the denominator.

10. The method of claim 9, further comprising:

comparing, by the computing device, the determined chaos parameter to a threshold chaos parameter, and responsive to determining that the determined chaos parameter exceeds the threshold chaos parameter, controlling, by the computing device, at least one parameter of a thermal spray gun configured to apply the thermally-sprayed layer.

11. The method of claim 5, further comprising generating, by the computing device, a plurality of intensity value parameters comprising the intensity value parameter by summing the luminance values of each pixel along each respective line segment of a plurality of line segments, each line segment of the plurality of line segments intersecting the center point of the circle and the circumference of the circle.

12. The method of claim 11, wherein the plurality of line segments consists of 360 line segments, each line segment displaced from every other line segment by an angle of one degree.

13. The method of claim 12, further comprising generating, by the computing device, a chart of the plurality of intensity value parameters, wherein the chart includes an axis for the plurality of intensity value parameters and an axis for a degree of the plurality of line segments relative to the u-axis, determining, by the computing device, a peak intensity value parameter of the plurality of intensity value parameters of the chart, generating, by the computing device, and based at least partially on the determined peak intensity value parameter, a chaos parameter as a number indicative of layering of a porosity of the thermally-sprayed layer.

14. The method of claim 13, wherein generating the chaos parameter comprises:

adding, by the computing device, the peak intensity value parameter to an intensity value parameter of the plurality of intensity value parameters that is separated by 180 degrees from the peak intensity value parameter and dividing by two to determine a numerator, adding, by the computing device, the peak intensity value parameter to three different intensity value parameters of the plurality of intensity value parameters and dividing by two to determine a denominator, wherein the three different intensity value parameters are separated from the peak intensity value parameter by 90 degrees, 90 degrees, and 180 degrees, respectively, and determining, by the computing device, the chaos parameter by dividing the numerator by the denominator.

15. The method of claim 1, further comprising normalizing, by the computing device, the image by adjusting a luminance value of at least one pixel of the matrix of pixels.

16. The method of claim 15, wherein normalizing, by the computing device, the image comprises correcting for non-uniform illumination of the cross-section of the thermally-sprayed layer by reducing or eliminating brightness gradients within the image.

17. A non-transitory computer-readable storage medium having stored thereon instructions that, when executed, configure a processor to:

receive an image indicative of a cross-section of a thermally-sprayed layer, the thermally-sprayed layer comprising a microstructure, the microstructure including a plurality of phase particles, wherein the image comprises a matrix of pixels, each pixel in the matrix of pixels defining a respective luminance value; and determine, based on the luminance values of the matrix of pixels, a quantification of a layering of the microstructure of the thermally-sprayed layer, wherein the layering is indicative of alignment of the plurality of phase particles with each other in layers, wherein determining the quantification of layering comprises determining, by the processor, a pattern in a distribution of the plurality of phase particles to determine the quantification of the layering of the microstructure of the thermally-sprayed layer.

18. A system comprising:

a thermal spray gun configured to apply a thermally-sprayed layer to a substrate;

an imaging device configured to capture an image indicative of a cross-section of the thermally-sprayed layer, the thermally-sprayed layer comprising a microstructure, the microstructure including a plurality of phase particles, wherein the image comprises a matrix of pixels, each pixel in the matrix of pixels defining a respective luminance value; and a computing device configured to:

receive the image indicative of a cross-section of the thermally-sprayed layer; and determine, based on the luminance values of the matrix of pixels, a quantification of a layering of the microstructure of the thermally-sprayed layer, wherein the layering is indicative of alignment of the plurality of phase particles with each other in layers, and wherein determining the quantification of layering comprises determining a pattern in a distribution of the plurality of phase particles.

* * * * *